US 6,650,483 B2

(12) United States Patent
Uehara et al.

(10) Patent No.: US 6,650,483 B2
(45) Date of Patent: Nov. 18, 2003

(54) OPTICAL ELEMENT, OPTICAL SYSTEM USING OPTICAL ELEMENT, AND OPTICAL DEVICE WITH OPTICAL ELEMENT

(75) Inventors: Tsukasa Uehara, Kawasaki (JP); Makoto Sekita, Yokohama (JP); Kenji Kawano, Tokyo (JP); Seiji Iida, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 09/995,463

(22) Filed: Nov. 27, 2001

(65) Prior Publication Data

US 2002/0054436 A1 May 9, 2002

Related U.S. Application Data

(60) Continuation of application No. 09/792,242, filed on Feb. 23, 2001, which is a division of application No. 08/915,044, filed on Aug. 20, 1997, now Pat. No. 6,243,208.

(30) Foreign Application Priority Data

| Aug. 22, 1996 | (JP) | 8-239840 |
| Oct. 31, 1996 | (JP) | 8-290047 |
| Oct. 31, 1996 | (JP) | 8-290048 |
| Oct. 31, 1996 | (JP) | 8-290049 |
| Oct. 31, 1996 | (JP) | 8-290050 |

(51) Int. Cl.$^7$ .............................. G02B 27/14
(52) U.S. Cl. ........................ 359/631; 359/633
(58) Field of Search .................. 359/631, 633, 359/636, 637, 639, 640, 819; 345/7, 9

(56) References Cited

U.S. PATENT DOCUMENTS

| 4,662,717 A | 5/1987 | Yamada et al. ............ 350/245 |
| 4,787,720 A | 11/1988 | Fukita et al. .............. 350/429 |
| 4,820,031 A | 4/1989 | Kastendieck et al. ...... 350/538 |
| 5,452,126 A | 9/1995 | Johnson ...................... 359/407 |
| 5,453,877 A * | 9/1995 | Gerbe et al. ................ 359/633 |
| 5,909,325 A * | 6/1999 | Kuba et al. ................. 359/834 |
| 5,912,769 A | 6/1999 | Iizuka et al. ............... 359/631 |
| 5,917,662 A | 6/1999 | Sekita ........................ 359/729 |
| 6,049,429 A | 4/2000 | Iizuka et al. ............... 359/631 |
| 6,243,208 B1 | 6/2001 | Uehara et al. .............. 359/631 |
| 6,351,333 B2 * | 2/2002 | Araki et al. ................ 359/566 |

FOREIGN PATENT DOCUMENTS

| EP | 0 730 180 A2 | 4/1996 |
| JP | 07-104166 | 4/1995 |

OTHER PUBLICATIONS

European Search Report, Feb. 27, 1998 for EP 97 11 4486.

* cited by examiner

*Primary Examiner*—Ricky Mack
(74) *Attorney, Agent, or Firm*—Morgan & Finnegan, LLP

(57) ABSTRACT

In an optical element (B1) prepared by integrally forming, on surfaces of a transparent member, a refracting surface (R2) for receiving a light beam, a plurality of reflecting surfaces (R3, R4, R5) with curvatures, and a refracting surface (R6) for outputting the light beam reflected by the plurality of reflecting surfaces, a reference portion (7) for defining the position of the optical element in a predetermined direction with respect to a Y'-Z' plane including an incident reference axis (5) and an exit reference axis (5) of at least one reflecting surface of the optical element (B1) is formed on the optical element.

6 Claims, 22 Drawing Sheets

OPTICAL ELEMENT, OPTICAL SYSTEM USING OPTICAL ELEMENT, AND OPTICAL DEVICE WITH OPTICAL ELEMENT

This is a continuation of co-pending application Ser. No. 09/792,242, filed Feb. 23, 2001, which is a division of Ser. No. 08/915,044 filed Aug. 20, 1997 now U.S. Pat. No. 6,243,208.

BACKGROUND OF THE INVENTION

1. Field of the Invention

The present invention relates to an optical element and an optical system using the same and, more particularly, to an optical system element suitable for, e.g., a video camera, still video camera, copying machine, and the like, and an optical system using the same.

The present invention also relates to an optical device which is used in, e.g., a silver halide camera, video camera, electronic still camera, or the like, and comprises an optical element formed integrally with a plurality of refracting surfaces and a plurality of reflecting surfaces.

2. Description of Related Art

Conventionally, as a photographing optical system, some components of which are built by reflecting surfaces, a so-called mirror optical system (reflection optical system), as shown in FIG. 12, is known.

FIG. 12 is schematic view showing principal part of a mirror optical system made up of one concave mirror and one convex mirror. In the mirror optical system shown in FIG. 12, an object light beam 104 coming from an object is reflected by a concave mirror 101, and propagates as a converging beam toward the object side. The light beam is reflected by a convex mirror 102, and thereafter, is refracted by a lens 110, thus forming an image on an image surface 103.

This mirror optical system is based on an arrangement of a so-called Cassegrainian reflecting telescope, and aims at shortening the total length of the optical system by folding the optical path of a telescope lens system with a large total lens length made up of a refraction lens using two reflecting mirrors.

In an objective lens system, such a telescope system, a large number of methods for shortening the total lengths of optical systems using a plurality of reflecting mirrors are known in addition to the Cassegrainian type for the same purpose as above.

In this manner, a compact mirror optical system is conventionally obtained by efficiently folding the optical path using a reflecting mirror in place of a lens of a photographing lens with a large total lens length.

However, in general, mirror optical systems such as a Cassegrainian reflecting telescope and the like suffer a problem that some object light rays are eclipsed by the convex mirror 102. This problem is caused by the presence of the convex mirror 102 in the passage region of the object light beam 104.

In order to solve this problem, there has also been proposed a mirror optical system that uses a decentered reflecting mirror to avoid the passage region of the object light beam 104 from being shielded by other portions of the optical system, i.e., to separate main rays of the light beam from an optical axis 105.

FIG. 13 is a schematic view showing principal part of a mirror optical system disclosed in U.S. Pat. No. 3,674,334. This optical solves the problem of eclipse using portions of reflecting mirrors which are rotationally symmetrical about the optical axis.

The mirror optical system shown in FIG. 13 includes a concave mirror 111, a convex mirror 113, and a concave mirror 112 in the passage order of a light beam, and these mirrors are originally rotationally symmetrical about an optical axis 114, as indicated by two-dashed chain lines in FIG. 13. Of these mirrors, only the upper side of the concave mirror 111, the lower side of the convex mirror 113, and the lower side of the concave mirror 112 with respect to the optical axis 114 on the plane of the drawing are used, thus constituting an optical system that separates main rays 116 of an object light beam 115 from the optical axis 114 and avoids the object light beam 115 from being eclipsed.

FIG. 14 is a schematic view showing principal part of a mirror optical system disclosed in U.S. Pat. No. 5,063,586. The mirror optical system shown in FIG. 14 solves the above problem by decentering the central axis itself of each reflecting mirror. In FIG. 14, if an axis perpendicular to an object surface 121 is defined to be an optical axis 127, central coordinates and central axes (an axis that connects the center of the reflecting surface and the center of curvature of that surface) 122a, 123a, 124a, and 125a of a convex mirror 122, a concave mirror 123, a convex mirror 124, and a concave mirror 125 in the passage order of a light beam are decentered from the optical axis 127. In this mirror optical system, by appropriately setting the decentering amounts and the radii of curvature of the individual surfaces at that time, an object light beam 128 can be prevented from being eclipsed by these reflecting mirrors, and an object image is efficiently formed on an imaging surface 126.

Also, U.S. Pat. Nos. 4,737,021 and 4,265,510 disclose an arrangement for avoiding eclipse using portions of reflecting mirrors which are rotationally symmetrical about the optical axis, and an arrangement for avoiding eclipse by decentering the central axis itself of each reflecting mirror from the optical axis.

As described above, by decentering the reflecting mirrors that build the mirror optical system, an object light beam can be avoided from being eclipsed. However, since the individual reflecting mirrors must be set to have different decentering amounts, a structure that attaches these reflecting mirrors is complicated, and it becomes very difficult to assure high alignment precision.

As one method of solving this problem, for example, a mirror system may be formed as a block to avoid assembly errors of optical parts upon assembly.

As conventional blocks having a large number of reflecting surfaces, for example, optical prisms such as a pentagonal roof prism, a Porro prism, and the like, which are used in a finder system or the like, a color separation prism that separates a light beam coming from a photographing lens into three, i.e., red, green, and blue color light beams and forms object images based on the individual color light beams on the surfaces of corresponding image sensing elements, and the like are known.

In these prisms, since a plurality of reflecting surfaces are integrally formed, the relative positional relationship among the reflecting surfaces is accurately determined, and the positions of the reflecting surfaces need not be adjusted.

However, the principal function of such prisms is to reverse an image by changing the traveling directions of light rays, and each reflecting surface is defined by a plane.

In contrast to this, an optical system in which reflecting surfaces of a prism have curvatures is also known.

FIG. 15 is a schematic view showing principal part of an observation optical system disclosed in U.S. Pat. No. 4,775, 217. This observation optical system allows an observer to observe the landscape of the outer field and also to observe an image displayed on an information display member overlapping the landscape.

In this observation optical system, a display light beam 145 originating from an image displayed on an information display member 141 is reflected by a surface 142, and propagates toward the object side. The light beam is then incident on a half mirror surface 143 defined by a concave surface. The light beam is reflected by the half mirror surface 143, and becomes a nearly collimated light beam by the refractive power of the concave surface 143. After the light beam is refracted by and transmitted through a surface 142, it forms an enlarged virtual image of the displayed image and enters the pupil 144 of the observer, thus making the observer to see the displayed image.

On the other hand, an object light beam 146 from an object is incident on and refracted by a surface 147 which is nearly parallel to the reflecting surface 142, and reaches the half mirror surface 143 as the concave surface. Since a semi-transparent film is deposited on the concave surface 143, some light components of the object light beam 146 are transmitted through the concave surface 142, are refracted by and transmitted through the surface 142, and then enter the pupil 144 of the observer. With these light components, the observer visually observes the displayed image overlapping the landscape of the outer field.

FIG. 16 is a schematic view showing principal part of an observation optical system disclosed in Japanese Patent Laid-Open Patent No. 2-297516. This observation optical system also allows the observer to observe the landscape of an outer field, and to observe an image displayed on an information display member overlapping the landscape.

In this observation optical system, a display light beam 154 originating from an information display member 150 is transmitted through a flat surface 157, that builds a prism Pa, to enter the prism Pa, and then strikes a parabolic reflecting surface 151. The display light beam 154 is reflected by the reflecting surface 151 to be converted into a converging light beam, and forms an image on a focal plane 156. At this time, the display light beam 154 reflected by the reflecting surface 151 reaches the focal plane 156 while being totally reflected by two parallel flat surfaces 157 and 158 that build the prism Pa, thus achieving a low-profile optical system as a whole.

The display light beam 154 that leaves the focal plane 156 as a diverging light beam is incident on a half mirror 152 defined by a parabolic surface while being totally reflected between the flat surfaces 157 and 158, and is reflected by the half mirror surface 152. At the same time, the light beam 154 forms an enlarged virtual image of the displayed image by the refractive power of the half mirror surface 152, and becomes a nearly collimated light beam. The light beam is transmitted through the surface 157 and enters a pupil 153 of the observer, thus making the observer to recognize the displayed image.

On the other hand, an object light beam 155 coming from an outer field is transmitted through a surface 158b that builds a prism Pb, is transmitted through the half mirror 152 defined by the parabolic surface, and is transmitted through the surface 157 to enter the pupil 153 of the observer. The observer visually observes the displayed image that overlaps the landscape of the outer field.

In this reference as well, the displayed image is observed and an object image can also be recognized by the arrangement similar to that in U.S. Pat. No. 4,775,217.

Furthermore, Japanese Patent Application Nos. 7-65109 and 7-123256 disclose a zoom optical system which has a plurality of transparent optical elements, each of which is formed integrally with a plurality of refracting surfaces and a plurality of reflecting surfaces, so that a light beam enters the transparent optical element from one refracting surface, and leaves externally from another refracting surface after it is repetitively reflected by the plurality of reflecting surfaces. Also, an image sensing device which forms an image on a solid-state image sensing element using such an optical system is disclosed in Japanese Patent Application Nos. 7-65104, 7-65106, 7-65107, 7-65108, and 7-65111.

SUMMARY OF THE INVENTION

As a conventional optical prism with reflecting surfaces having curvatures normally suffers larger variations in optical performance due to decentering errors of the reflecting surfaces than an optical prism made up of only flat surfaces, the allowable positional precision of each reflecting surface is very strict, and such optical prism is not easy to manufacture.

When such optical prism is moved for focusing or zooming, the optical prism and a holding member for holding it must be precisely coupled to each other. However, in U.S. Pat. No. 4,775,217, Japanese Patent Laid-Open No. 2-297516, and the like disclose the arrangements of such optical prisms alone, but do not mention any methods of guaranteeing the positional precision of the reflecting surfaces and the optical prism itself, any holding method of the holding member, and the like.

In a conventional coaxial optical system, the optical system can be inspected with reference to its optical axis in the manufacture, measurements, assembly, and the like. However, in such optical prism which has decentered reflecting surfaces without any optical axis, a method of setting a reference portion that serves as a reference upon inspecting the optical system in the manufacture, measurements, assembly, and the like of such optical system is indispensable.

It is an object of the present invention to provide an optical element and an optical system using the same, which can improve precision in the manufacture, assembly, and measurements of an optical element, and can prevent optical performance from deteriorating.

Also, the present invention has the following objects:
i) to make a reference portion in the optical element easy to use by limiting a specific direction to a parallel direction and/or a perpendicular direction;
ii) to accurately and securely hold the optical element on a holding member or the like by forming an auxiliary portion for assisting position determination of the optical element in addition to the reference portion to be parallel or perpendicular to the reference portion, and arranging at least one auxiliary portion to oppose the reference portion;
iii) to satisfactorily hold the holding member and the optical element upon holding the optical element by setting the reference and auxiliary portions so that the position of the center of gravity of a region sandwiched between the reference and auxiliary portions substantially matches that of the optical element;
iv) to obtain an optical element which suffers less ghost, can prevent the reference portion and/or the auxiliary portion from shielding effective light rays, and can reduce harmful light rays that may be produced by the reference portion and/or the auxiliary portion, by forming the reference portion and/or the auxiliary portion on a region other than the light ray effective portion of the optical element;

v) to satisfactorily hold and fix an optical element in correspondence with every situations by defining the reference portion and/or the auxiliary portion by a plurality of flat surfaces, hole portions, or projections;

vi) to arrange a holding member that holds the optical element to move or fix the optical element, and to precisely position the holding member and the optical element by forming, on the holding member, portions that fit or join the reference portion and/or the auxiliary portion formed on the optical member;

vii) to obtain an optical element suffering less ghost, which can eliminate harmful light rays entering the optical element from the holding member as much as possible by forming a predetermined air gap between the holding member and the optical element in a region other than the fitting or joining portions when the optical element and the holding member for the optical element are fitted or joined to each other;

viii) to obtain a high degree of parallelism between the central axis of a fitting hole and a plane including a reference axis by integrally forming the fitting hole for receiving a guide bar for moving the optical element in the optical element;

ix) to set the central axis of the fitting hole to be parallel to the incident reference axis of the optical element by forming the fitting hole for receiving the guide bar for moving the optical element in the optical element, and to eliminate changes in posture upon movement of the optical element as much as possible when an optical system is built using the optical element; and x) to further eliminate changes in posture upon movement of the optical element when an optical system is built using the optical element, by setting the central axis of the fitting hole to be parallel to the incident reference axis of the optical element in a plane including the reference axis of the optical element.

On the other hand, none of the above-mentioned prior arts touch upon any method of attaching an optical element.

The present invention has been made in consideration of such situation, and has as its object to prevent deterioration of optical performance due to the way of attaching an optical element in an optical device which comprises an optical element which is arranged so that a light beam enters the optical element from one refracting surface, and leaves externally from another refracting surface after it is repetitively reflected by a plurality of reflecting surfaces.

None of the above-mentioned prior arts mention any structure of an optical device that takes changes in temperature into consideration.

The present invention has been made in consideration of such situation, and has as its object to prevent an image from deteriorating due to expansion and shrinkage of an optical element due to changes in temperature, changes in refractive index due to such expansion or shrinkage, and the like, in an optical device comprising a zoom optical system having a plurality of optical elements each of which is arranged so that a light beam enters the optical element from one refracting surface, and leaves externally from another refracting surface after it is repetitively reflected by a plurality of reflecting surfaces, and a driving means for zoom-driving the zoom optical system.

Furthermore, Japanese Patent Application Nos. 7-65109 and 7-123256 do not mention size reduction of such optical device. On the other hand, Japanese Patent Application Nos. 7-65104, 7-65106, 7-65107, 7-65108, and 7-65111 propose a low-profile structure of such optical device, but apply it to a driving source different from a general driving motor.

The present invention has been made in consideration of such situation, and has as its object to attain a size reduction of an optical device comprising a zoom optical system having a plurality of optical elements each of which is arranged so that light beam enters the optical element from one refracting surface, and leaves externally from another refracting surface after it is repetitively reflected by a plurality of reflecting surfaces, and a driving means for zoom-driving the zoom optical system.

None of the above-mentioned prior arts mention in detail a structure for driving an optical element with high precision.

The present invention has been made in consideration of such situation, and has as its object to realize high-precision zoom driving in an optical device comprising a zoom optical system having a plurality of optical elements each of which is arranged so that light beam enters the optical element from one refracting surface, and leaves externally from another refracting surface after it is repetitively reflected by a plurality of reflecting surfaces, and a driving means for zoom-driving the zoom optical system.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
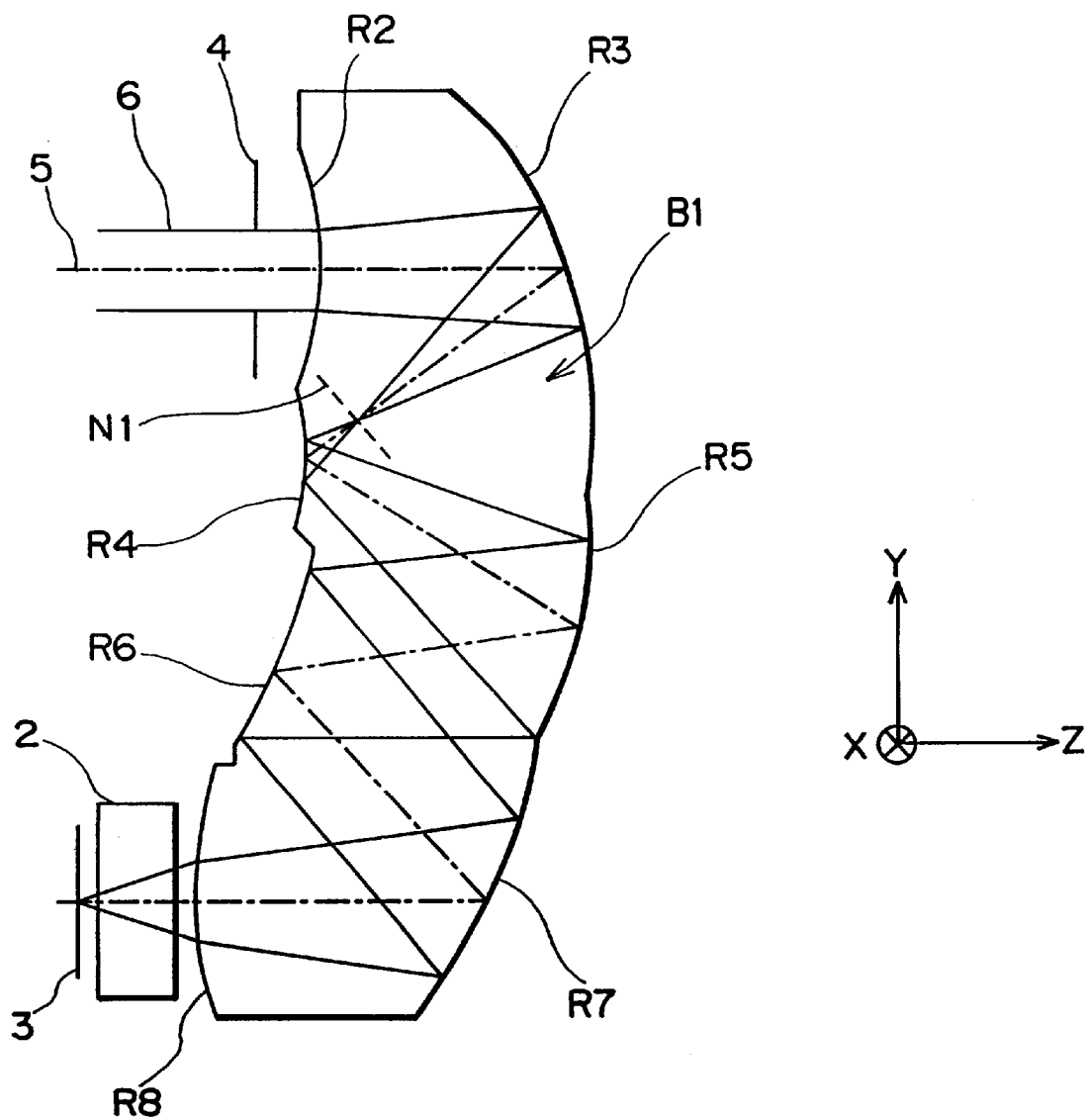
FIG. 1 is a sectional view of an optical system according to an embodiment of the present invention.

An optical element of the present invention and an optical system using the same do not have any symmetrical axis like an optical axis in a normal optical system. Hence, in the optical system of the present invention, a "reference axis" corresponding to the optical axis in the coaxial system is set, and the arrangement of individual elements in the optical system will be described on the basis of the reference axis.

Definition of the reference axis will be given below. In general, the optical path of a certain light ray of a reference wavelength that leaves an object surface and reaches an image surface, and serves as a reference is defined as the "reference axis" in that optical system. However, since this definition alone cannot define a light ray that serves as a reference, the reference axis light ray is normally set according to one of the two following rules:

Rule 1: When an axis in which an optical system has symmetry, albeit partially is present, and an aberration correction can be symmetrically made about this axis, a light ray that propagates along the symmetry axis is defined as the reference axis light ray.

Rule 2: When no symmetry axis is generally present in an optical system, or when an aberration correction cannot be symmetrically made about a symmetrical axis even if such symmetrical axis is partially present, a light ray that leaves the center of the object surface (the center of the range to be photographed or observed), passes through an optical system in the order of designated surfaces of the optical system, and passes through the center of a stop in the optical system, or a light ray that passes through the center of the stop in the optical system and reaches the center of the final image surface, is set as the reference axis light ray, and its optical path is defined to be the reference axis.

The reference axis defined in this manner normally has a folded shape. In each surface, the intersection between the surface and the reference axis light ray is defined to be a reference point, the reference axis light ray on the object side of each surface is defined as an incident reference axis, and the reference axis light ray on the image side of each surface is defined as an exit reference axis. Furthermore, the reference axis has a direction, which is assumed to be a direction in which the reference axis light ray propagates upon forming an image. Hence, an incident reference axis direction and an exit reference axis direction are respectively present on the incident and exit sides. In this manner, the reference axis finally reaches the image surface while changing its direction in accordance with the refraction or reflection rule in the order of surfaces which is set in advance. In an optical element (optical system) made up of a plurality of surfaces, the reference axis light ray that enters a surface closest to the object side is defined to be an incident reference axis of that optical element (optical system), and the reference axis light ray that leaves from a surface closest to the image side is defined to be an exit reference axis of that optical element (optical system). The definitions of the directions of these incident and exit reference axes are the same as those of the surfaces.

Prior to a description of the embodiments, the method of expressing configuration data of the embodiments, and common factors throughout the embodiments will be explained below.

Figure 11:
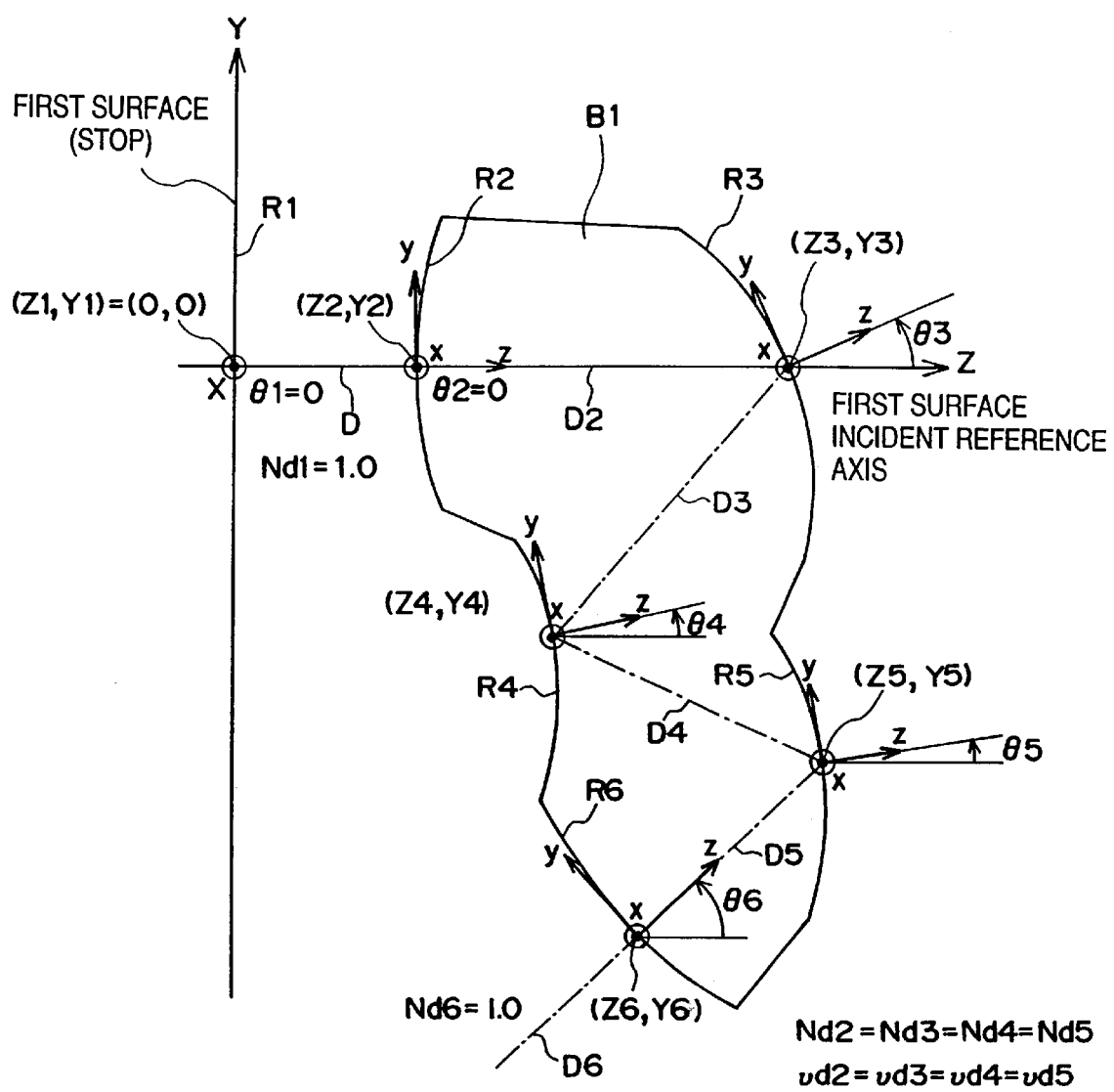
FIG. 11 is an explanatory view of a coordinate system that defines configuration data of the optical system of the present invention.
Figure 12:
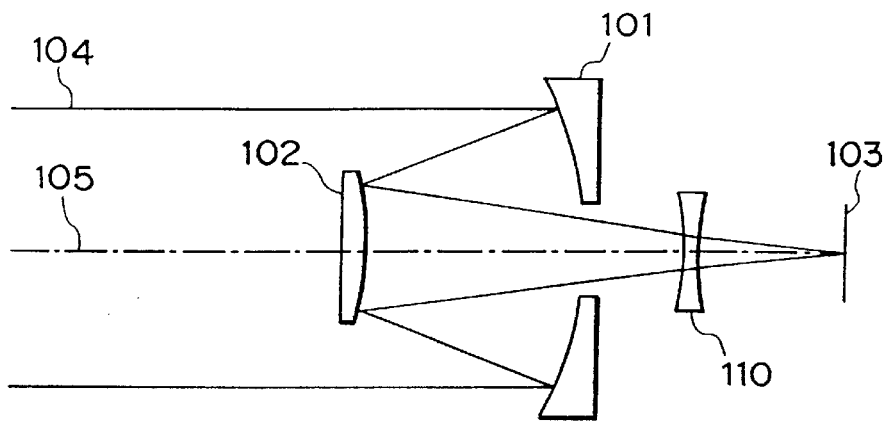
FIG. 12 is a schematic view showing principal part of a conventional reflecting optical system.
Figure 13:
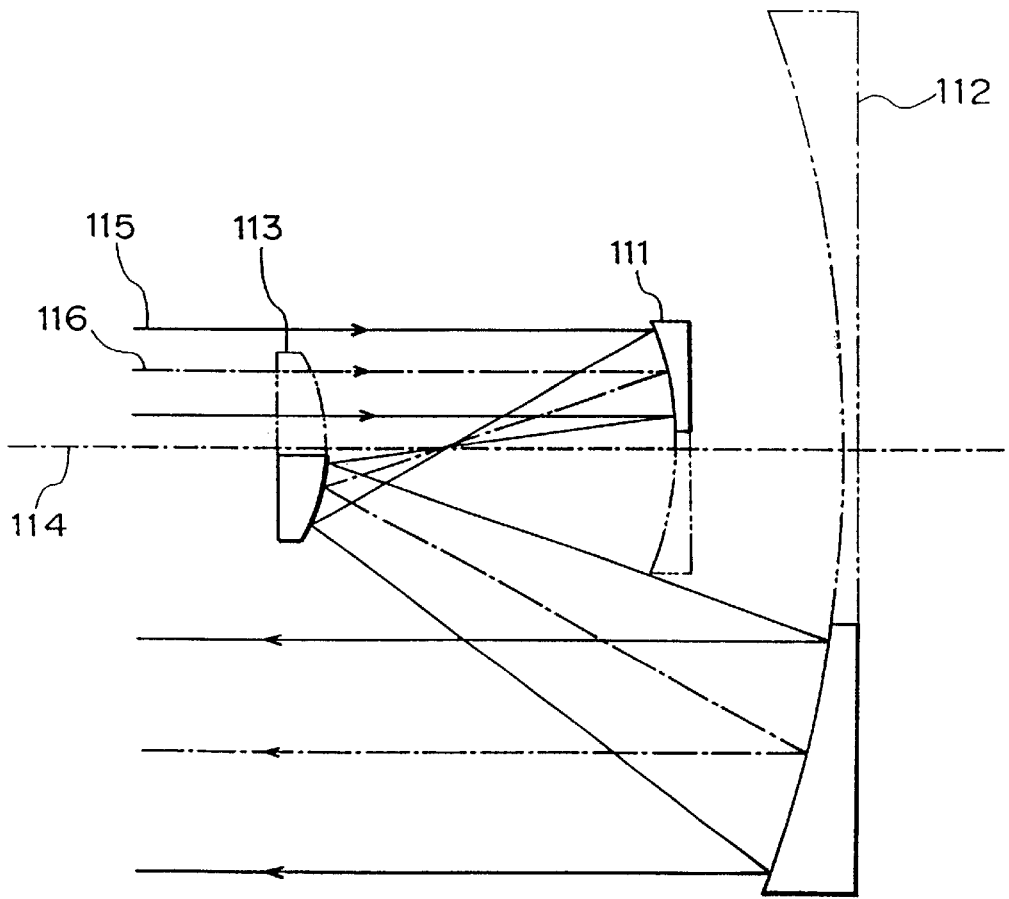
FIG. 13 is a schematic view showing principal part of a conventional reflecting optical system.
Figure 14:
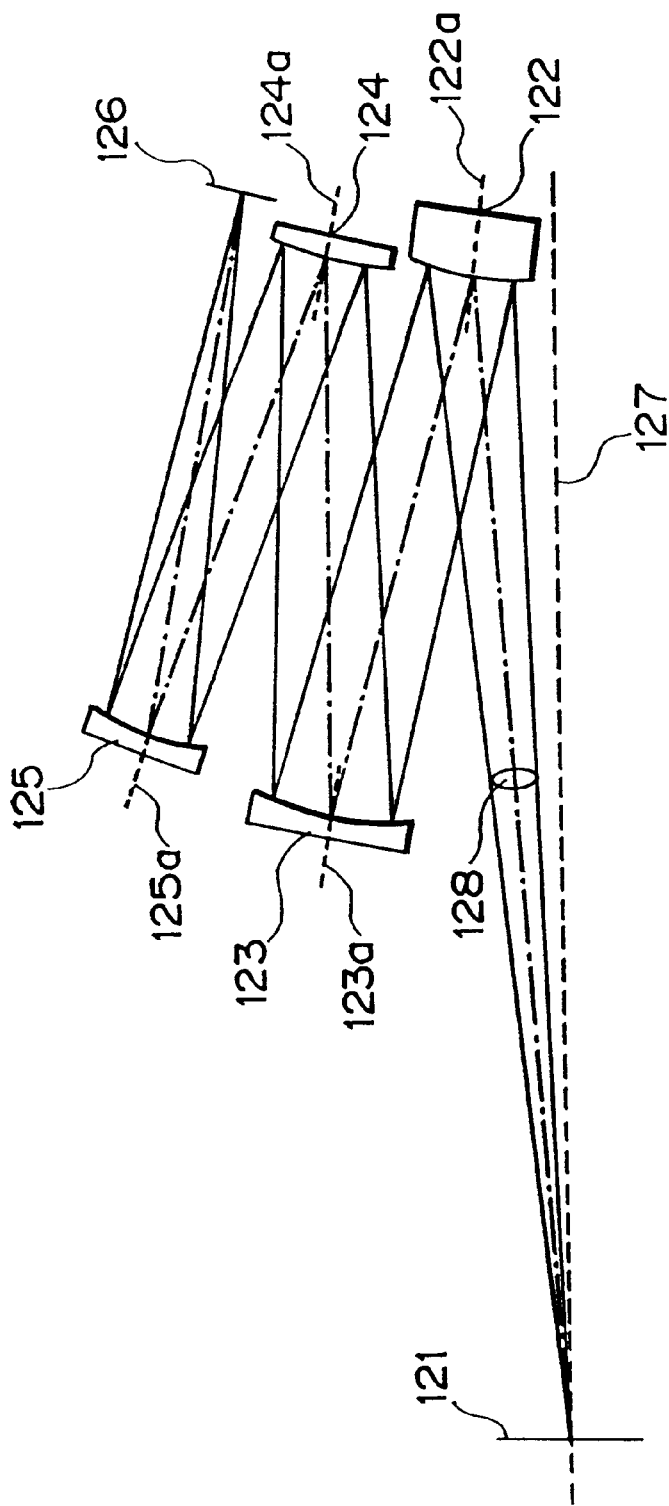
FIG. 14 is a schematic view showing principal part of a conventional reflecting optical system.
Figure 15:
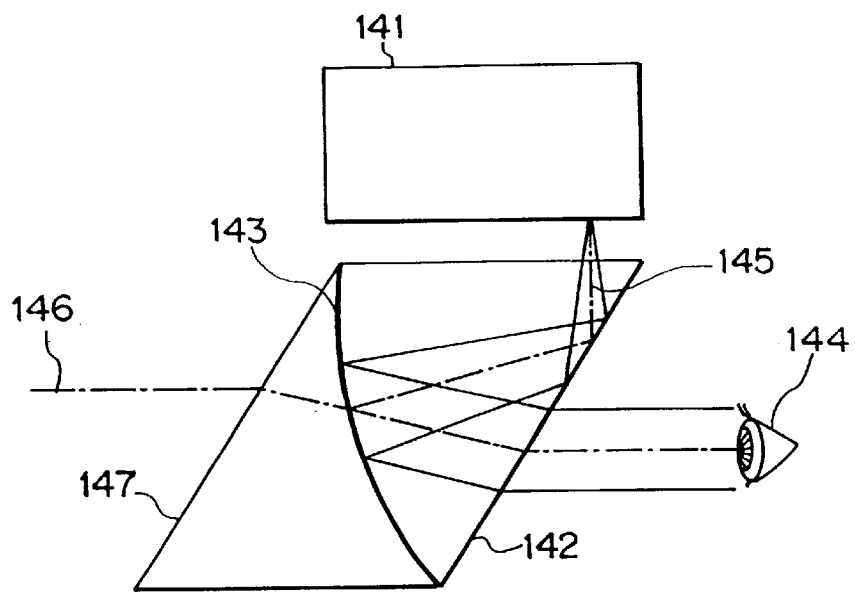
FIG. 15 is a schematic view showing principal part of a conventional observation optical system.
Figure 16:
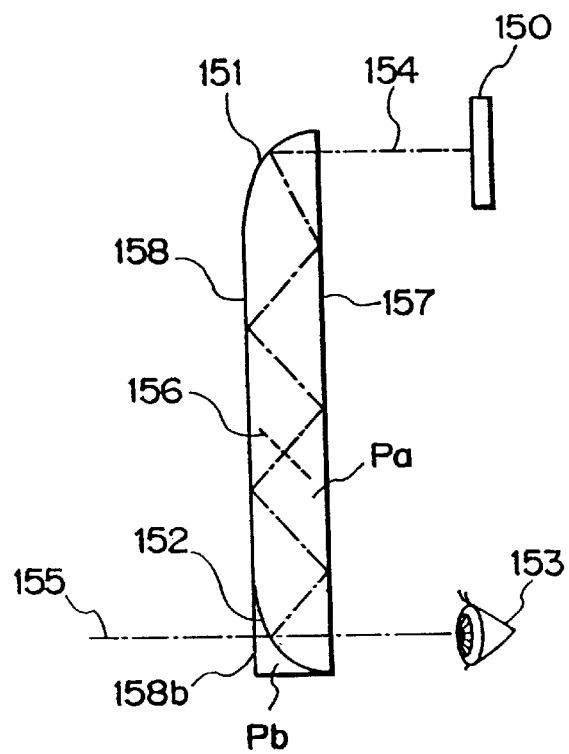
FIG. 16 is a schematic view showing principal part of a conventional observation optical system.

FIG. 11 is an explanatory view of a coordinate system that defines configuration data of the optical system of the present invention. In an embodiment of the invention, a surface at an i-th position along one light ray (indicated by a dotted line in FIG. 11 and to be referred to as a reference axis light ray hereinafter) that travels from the object side toward the image side will be referred to as an i-th surface hereinafter.

In FIG. 11, a first surface R1 is a stop (an aperture), a second surface R2 is a refracting surface coaxial with the first surface, a third surface R3 is a reflecting surface which is tilted with respect to the second surface R2, fourth and fifth surfaces R4 and R5 are reflecting surfaces which are respectively shifted and tilted with respect to their previous surfaces, and a sixth surface R6 is a refracting surface which is shifted and tilted with respect to the fifth surface R5. The second to sixth surfaces R2 to R6 are formed on a single optical element made from a medium such as glass, plastic, or the like, and this optical element is referred to as an optical element B1 in FIG. 11.

Hence, in the arrangement in FIG. 11, the medium from an object surface (not shown) to the second surface R2 is air, the media between adjacent ones of the second to sixth surfaces R2 to R6 are a certain common medium, and the media between the sixth surface R6 and a seventh surface R7 (not shown) is air.

Since the optical system of the present invention is a decentered optical system, the individual surfaces that build the optical system do not have any common optical axis. In this embodiment, an "absolute coordinate system of the optical system" having, as an origin, the center of the light ray effective diameter of the first surface serving as the stop is set. In the present invention, the individual axes of the absolute coordinate system of the optical system are set as follows.

Z-axis: the reference axis that passes through the origin and extends toward the second surface R2

Y-axis: a straight line that passes through the origin and 90° counterclockwise with the Z-axis within a tilt plane (within the plane of the drawing of FIG. 11)

X-axis: a straight line that passes through the origin and is perpendicular to the Z- and Y-axes (a straight line perpendicular to the plane of the drawing of FIG. 11)

Since the surface shape of the i-th surface that builds the optical system is preferably expressed by setting a local coordinate system which has, as a reference point, the intersection between the reference axis and the i-th surface so as to allow easier understanding than that expressed by the absolute coordinate system upon recognizing the shape, numerical value data of each embodiment of the present invention express the surface shape of the i-th surface by the local coordinate system.

The tilt angle of the i-th surface in the Y-Z plane is expressed by an angle θi (unit: °) which has a positive value in the counterclockwise direction with respect to the Z-axis of the absolute coordinate system of the optical system. Hence, in this embodiment, the origin of the local coordinate system of each surface is present on the Y-Z plane in FIG. 11. Neither tilt nor shift take place in the X-Z and X-Y planes. Furthermore, the y- and z-axes of the local coordinate system (x, y, z) of the i-th surface are tilted by the angle θi in the Y-Z plane with respect to the absolute coordinate system (X, Y, Z) of the optical system, and are set as follows:

z-axis: a straight line that passes through the origin of the local coordinate system, and makes the angle θi counterclockwise in the Y-Z plane with the Z-direction of the absolute coordinate system of the optical system y-axis: a straight line that passes through the origin of the local coordinate system and 90° counterclockwise in the Y-Z plane with the z-direction x-axis: a straight line that passes through the origin of the local coordinate system, and is perpendicular to the Y-Z plane Also, Di is the scalar quantity that represents the interval between the origins of the local coordinate systems of the i-th and (i+1)-th surfaces, and Ndi and vdi are respectively the refractive index and Abbe's number of the medium between the i-th and (i+1)-th surfaces. Note that the stop and the final imaging surface are displayed as independent flat surfaces.

Each embodiment of the present invention has a spherical surface and an aspherical surface with rotational asymmetry. Of these surfaces, a spherical surface portion is assumed to have a spherical shape and is described with its radius Ri of curvature. Assume that the radius Ri of curvature has a positive sign when the center of curvature points in the plus direction of the z-axis of the local coordinate system, and has a minus sign when the center points in the minus direction of the z-axis.

The spherical surface has a shape expressed by the following equation (1):

$$z = \frac{(x^2 + y^2)/R_i}{1 + \{1 - (x^2 + y^2)/R_i^2\}^{1/2}} \quad (1)$$

The optical system of the present invention has at least one rotation-asymmetric aspherical surface, whose shape is expressed by the following equation (2):

$$z = A/B + C_{02}y^2 + C_{11}xy + C_{20}x^2 + C_{03}y^3 + C_{12}xy^2 + C_{21}x^2y + \\ C_{30}x^3 + C_{04}y^4 + C_{13}xy^3 + C_{22}x^2y^2 + C_{31}x^3y + C_{40}x^4 + \ldots \quad (2)$$

for $A = (a+b) \cdot (y^2 \cdot \cos^{2}t + x^2)$ $B = 2a \cdot b \cdot \cos t[1 + \{(b-a) \cdot y \cdot \sin t/(2a \cdot b)\} +$ $[1 \{(b-a) \cdot y \cdot \sin t/(a \cdot b)\} - \{y^2/(a \cdot b)\} -$ $\{4a \cdot b \cdot \cos^{2}t + (a+b)^2 \sin^{2}t\}x^2$ $/(4a^2b^2 \cos^{2}t)]^{1/2}]$ Note that the shape of each rotation-asymmetrical surface in the present invention is set to have a shape symmetrical about the y-z plane by using only even-numbered order terms associated with x and setting odd-numbered order terms at "0" in the above equation that represents the curved surface.

When the condition given by equation (3) below is satisfied, the surface has a shape symmetrical about the x-z plane:

$$C_{03} = C_{21} = t = 0 \quad (3)$$

Furthermore, when the condition given by equation (4) below is satisfied, that surface has a shape with rotation symmetry:

$$C_{02} = C_{20} = C_{04} = C_{40} = C_{22}/2 \quad (4)$$

If neither conditions are satisfied, the surface has a shape with rotation asymmetry.

In the numerical value data, a horizontal half field angle uY is the maximum field angle of a light beam which is incident on the first surface R1 in the Y-Z plane in FIG. 11, and a vertical half field angle uX is the maximum field angle of a light beam which is incident on the first surface R1 in the X-Z plane.

As data that represents the brightness of the optical system, the diameter of a stop (aperture) (entrance pupil) represents the stop (aperture) diameter. Also, an image size is the effective image range on the image surface. The image size is expressed by a rectangular region defined by "horizontal" indicating the size in the y-direction and "vertical" indicating the size in the x-direction both of the local coordinate system.

FIG. 1 is a sectional view of an optical system according to one embodiment of the present invention, and shows an optical path. Reference numeral B1 denotes an optical element formed integrally with a plurality of reflecting surfaces with curvatures. The optical element B1 is prepared by forming on the surfaces of a transparent member, an incident refracting surface R2, five reflecting surfaces, i.e., a concave mirror R3, a convex mirror R4, a concave mirror R5, a convex mirror R6, and a concave mirror R7, and an exit refracting surface R8 along the reference axis light ray in the order from the object side. These refracting surfaces and reflecting surfaces are symmetrical about the plane of the drawing (Y-Z plane), and hence, all the reference axes are included in the Y-Z plane. The direction of the incident and exit reference axes of the optical element B1 are antiparallel to each other. Note that a reflecting film is formed on each reflecting surface. Furthermore, the optical element B1 has two side surfaces parallel to the plane of the drawing.

Reference numeral 2 denotes an optical correction plate such as a quartz low-pass filter, an infrared cut filter, or the like; and 3, a final imaging surface, where the image sensing surface of an image sensing element such as a CCD or the like is located. Reference numeral 4 denotes a stop arranged on the object side of the optical element B1; and 5, a reference axis of the optical system.

The imaging process in this embodiment will be explained below. The amount of an incident light beam 6 coming from an object is limited by the stop 4, and the light beam 6 is incident on the incident refracting surface R2 of the optical element B1. The light beam 6 is refracted by the surface R2, and reaches the concave mirror R3.

The concave mirror R3 reflects the object light beam 6 toward the convex mirror R4, and forms a primary object image on an intermediate imaging surface N1 by the power of the concave mirror.

In this manner, since the object image is formed in the optical element B1 in an early stage, an increase in light ray effective diameter of the surfaces arranged on the image side due to the stop 4 is suppressed.

The object light beam 6 that formed the primary image on the intermediate imaging surface N1 is reflected in turn by the convex mirror R4, concave mirror R5, convex mirror R6, and concave mirror R7, and reaches the exit refracting surface R8 while being influenced by the powers of these reflecting mirrors. The light beam 6 is refracted by the surface R8, and leaves the optical element B1. The object light beam 6 is then transmitted through the optical correction plate 2, and forms an image on the final image surface 3.

In this manner, the optical element B1 serves as a lens unit which has desired optical performance while repeating reflections by the plurality of reflecting mirrors with curvatures, has an imaging effect as a whole, and has a very low profile in the X-direction.

In this optical system, focusing is attained by moving the optical element B1 in a direction parallel to its incident reference axis.

FIG. 1 shows an example of the optical system of the present invention. As another optical system of the present invention, a zooming optical system which has a plurality of optical elements each of which is integrally formed with a plurality of reflecting surfaces with curvatures, and moves these optical elements to attain zooming is also available.

Since the optical system of the present invention is used while being built in a video camera, still video camera, copying machine, or the like, the image sensing element, the optical correction plate, and the like are fixed to the main body (not shown), and the optical element B1 of this embodiment is coupled to a holding member and is attached to be movable with respect to the main body, thus building the optical system.

The XYZ coordinate system shown in FIG. 1 is the absolute coordinate system of the optical system, and is assumed to be set on the main body.

[First Embodiment]

Figure 2:
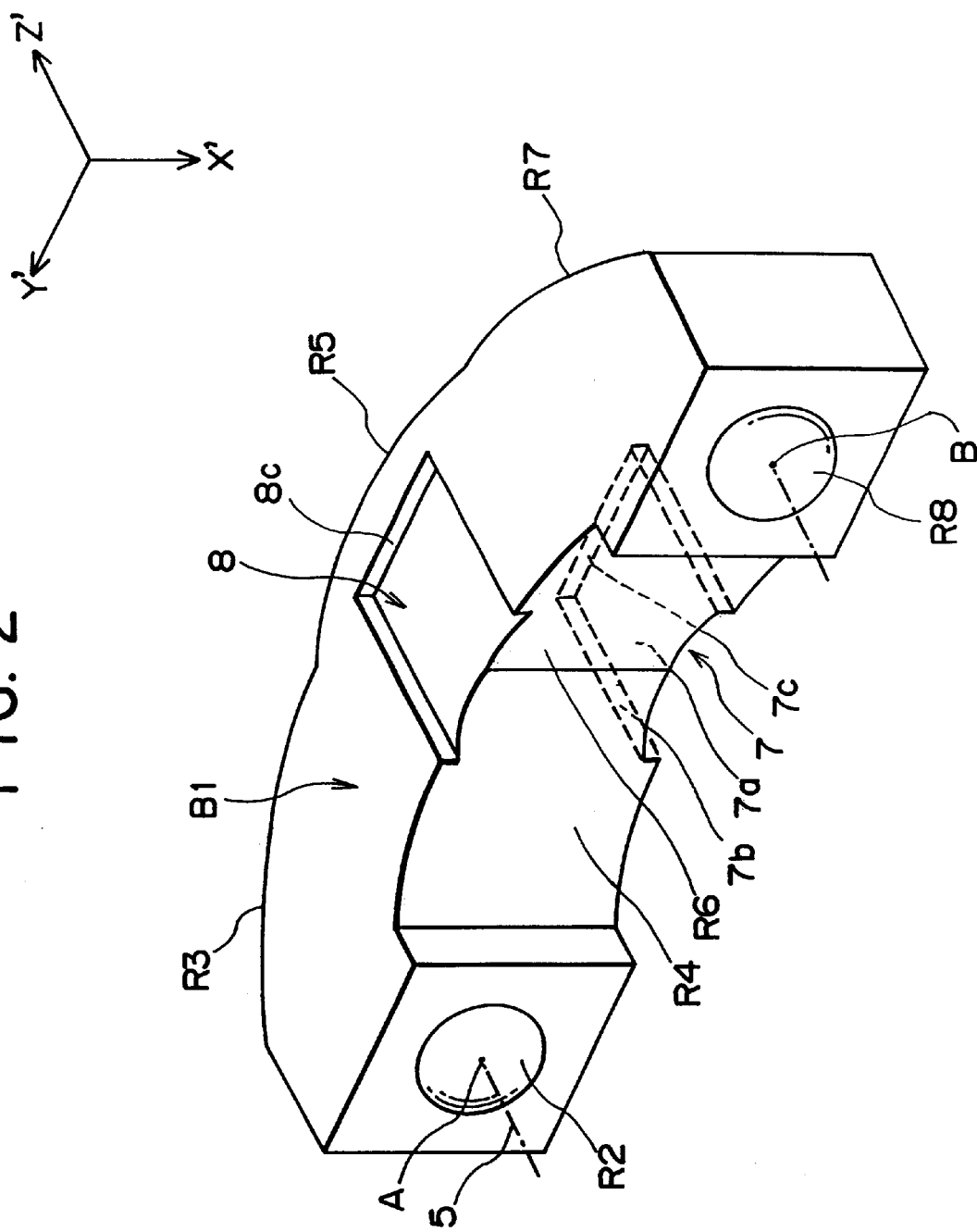
FIG. 2 is a perspective view of an optical element according to the first embodiment of the present invention.

FIG. 2 is a perspective view of an optical element according to the first embodiment of the present invention. The same reference numerals in FIG. 2 denote the same parts as in FIG. 1. Note that an X'Y'Z' coordinate system shown in FIG. 2 is an "absolute coordinate system of an optical element", and the individual axes are set as follows to have, as the origin, a reference point (a reference point of an incident refracting surface R2 in this embodiment) of a certain surface present on a plane (its definition will be described later) including the reference axis of the optical element:

Z'-axis: the incident reference axis to the reference point

Y'-axis: a straight line that passes through the origin in the plane including the reference axis of the optical element, and 90° counterclockwise with the Z-axis X'-axis: a straight line that passes through the origin and is perpendicular to the Z'- and Y'-axes.

In all the optical elements of the individual embodiments to be described below, the X'Y'Z' coordinate system is the one described above.

In FIG. 2, reference numeral 7 denotes a reference portion, which is formed by three surfaces 7a, 7b, and 7c, and another surface on a side surface (to be referred to as a forming surface in the sense of forming the reference portion) of an optical element B1, and defines the position of the optical element B1 in a specific direction.

Of the surfaces that form the reference portion 7, the surface 7a is parallel to a plane (Y'-Z' plane) including a reference axis 5, and defines the position of the optical element B1 on the Y'-Z'plane. On the other hand, the surfaces 7b and 7c are perpendicular to the plane (Y'-Z' plane) including the reference axis 5. The surface 7b defines the position of the optical element B1 on the Z'-X' plane, and the surface 7c defines the position of the optical element B1 on the X'-Y' plane.

The reference portion 7 defines the position of the optical element B1 in a specific direction with respect to a plane that includes an incident and exit reference axes of at least one reflecting surface of the optical element B1.

In this manner, since the position of the optical element B1 is defined using the reference portion 7, the relative positional relationship among the individual surfaces that define the optical element B1 and the reference portion 7 can be expressed to allow easy understanding.

In a conventional coaxial optical system, a single axis common to lenses that build that optical system is present as its name implies, and the characteristics of the individual lenses can be two-dimensionally expressed with reference to this axis.

However, in an optical element that allows a free three-dimensional layout of the individual surfaces as in this embodiment, an axis that serves as a reference in design may be set, but it is hard to set an axis that serves as a reference from its outer appearance.

For this reason, in this embodiment, a reference portion is set on the optical element, so that a coordinate system normally set on a virtual space can be set on the optical element in a visible form. With this coordinate system, when the optical element of this embodiment is formed by molding, the individual surfaces can be worked with reference to the reference portion 7 upon working molds used in formation by molding. Also, when the positional relationship among the individual surfaces of a molded product is measured with reference to the reference portion 7, the mold working data and the measurement data of the molded product can be made common. Even when errors have occurred during working, the working data can be easily corrected based on the measurement data, and the optical element can be worked with high precision.

In this embodiment, an auxiliary portion 8 is formed on the optical element B1 in addition to the reference portion 7 to improve the holding precision of the optical element. The reference portion 7 is formed on one side surface of the optical element, and the auxiliary portion 8 is formed at a position facing the reference portion 7 on another side surface (forming surface) to have a shape similar to that of the reference portion 7. That is, the auxiliary portion 7 has surfaces, which respectively correspond to the surfaces 7a, 7b, and 7c that define the reference portion 7, and are parallel to these surfaces 7a, 7b, and 7c. The auxiliary portion 8 helps define the position of the optical element B1 by the reference portion 7.

At this time, when the reference and auxiliary portions 7 and 8 are formed to face each other, so that the position of the center of gravity of the optical element B1 is located within the region sandwiched between the reference and auxiliary portions 7 and 8, the optical element B1 can be held on the holding member with good balance when it is held by the holding member via the reference and auxiliary portions 7 and 8.

The reference and auxiliary portions 7 and 8 are formed in consideration of an effective light ray transmission region inside the optical element B1, and of course, they are formed on portions that do not shield the light ray effective portion of the optical element B1.

In this embodiment, the reference portion 7 is defined by the surfaces 7a, 7b, and 7c which are parallel or perpendicular to the plane (Y'-Z' plane) including the reference axis 5. Alternatively, the reference portion 7 may be defined with respect to a plane perpendicular to the reference axis 5 at an intersection A between the reference axis 5 and the incident refracting surface R2 or an intersection B between the reference axis 5 and the exit refracting surface R8.

Furthermore, in this embodiment, the surfaces that form the reference portion 7 are set to be parallel or perpendicular to the plane (Y'-Z' plane) including the reference axis 5 to help understand the relationship between the plane including the reference axis and the reference portion. Of course, the reference portion may be set to tilt a predetermined angle with respect to the plane (Y'-Z' plane) including the reference axis of the optical element.

Figure 3:
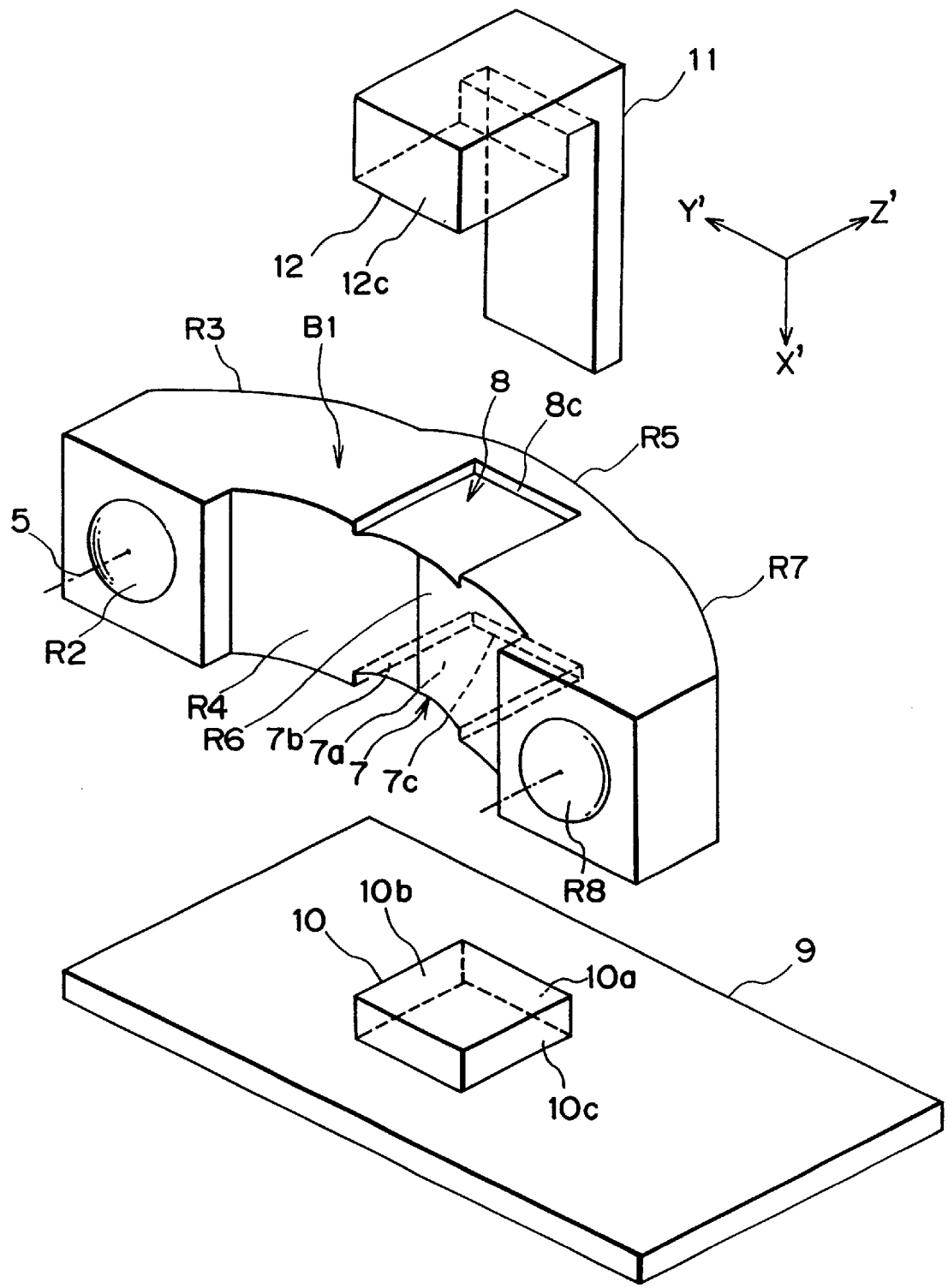
FIG. 3 is an explanatory view showing a case wherein the optical element of the first embodiment is held by a holding member.

FIG. 3 is an explanatory showing a case wherein the optical element B1 is held by holding members 9 and 11 using the reference portions 7 and the auxiliary portion 8 of the first embodiment. In FIG. 3, reference numeral 9 denotes a holding member which has a rectangular projection (coupling portion) 10 to be coupled to the reference portion 7 thereon. The holding member 9 is movably coupled to the main body (not shown) via a moving surface. Also, reference numeral 11 denotes another holding member, which has a projection (coupling portion) 12 to be coupled to the auxiliary portion 8 thereon.

A method of coupling the optical element B1 to the holding members will be explained below. The surfaces 7a, 7b, and 7c that define the reference portion 7 of the optical element B1 are joined to surfaces 10a, 10b, and 10c that define the projection 10 of the holding member 9 to define the positions of the X'-, Y'-, and Z'-axes of the optical elements B1 with respect to the holding member 9.

Subsequently, a surface 8c that forms the auxiliary portion 8 of the optical element B1 is joined to a surface 12c that forms the projection 12 of the holding member 11, and thereafter, the holding member 11 is coupled to the holding member 9. In this manner, the optical element B1 can be clamped by the two holding members and, hence, the optical element B1 is accurately and reliably held on the holding member 9 by a uniform force with respect to the holding direction, i.e., the X'-direction.

Furthermore, since the surface 10a of the projection 10 of the holding member 9 is formed to be parallel to the moving surface of the holding member 9, the plane (Y'-Z' plane) including the reference axis 5, the surface 7a of the reference portion 7, and the moving surface of the holding member 9 become parallel to each other. With this arrangement, when the optical element B1 is moved together with the holding member 9 upon focusing or zooming, a high degree of parallelism between the moving surface of the holding member 9 and the optical element B1 can be guaranteed, and the influences of, e.g., decentering of the reference axis that is likely to occur upon movement of the optical element B1, can be eliminated, thus preventing deterioration of the optical performance.

Also, in this embodiment, by modifying the holding method of the optical element B1 and the holding members, an optical system that produces less harmful light rays can be built. This state will be explained below with reference to FIGS. 4 and 5.

Figure 4:
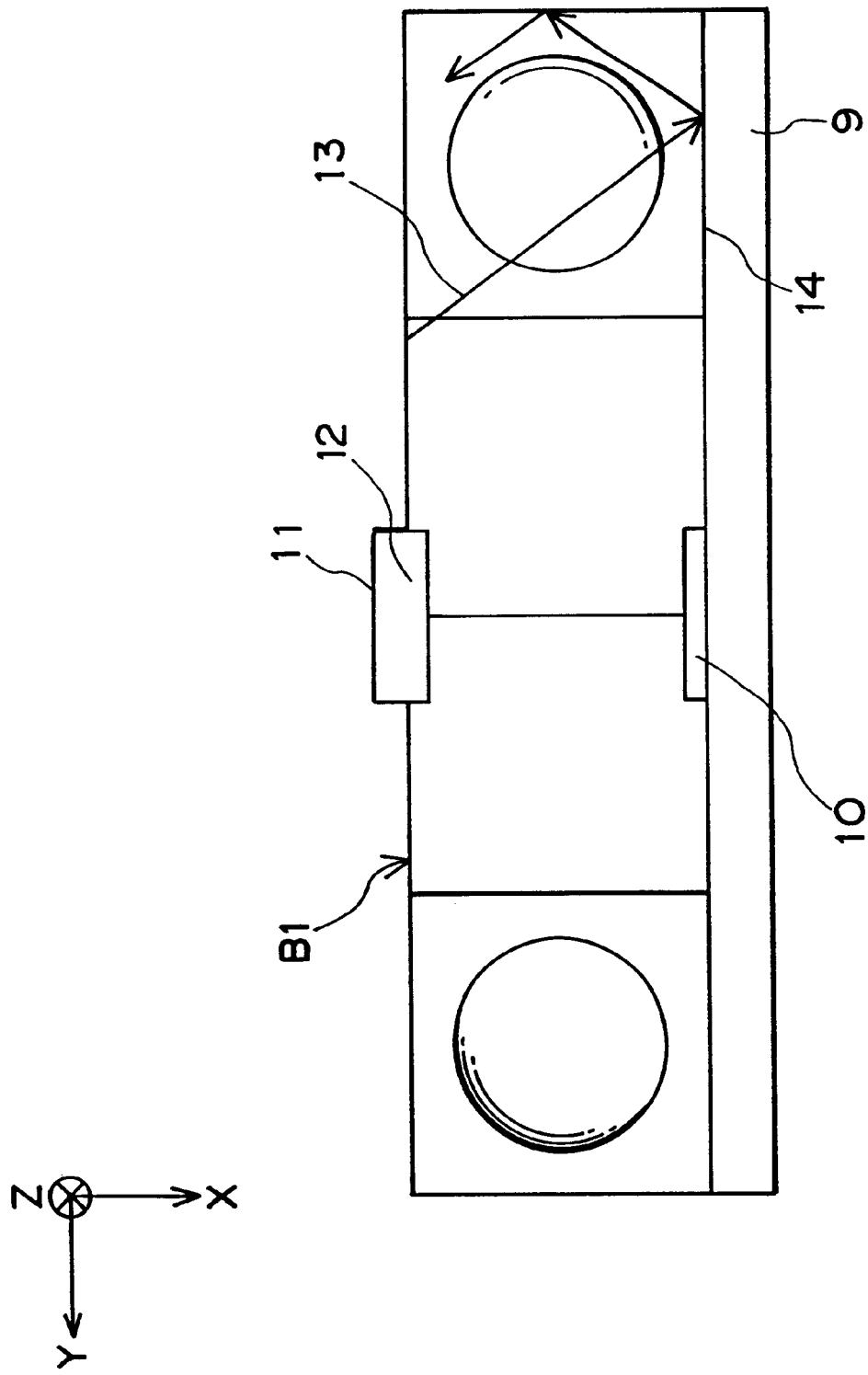
FIG. 4 is a front view showing a case wherein an optical element is improperly coupled to a holding member to form an optical system.

FIG. 4 is a front view showing a case wherein the optical element B1 is improperly coupled to the holding members 9 and 11 to build the optical system. In this case, the reference portion 7 of the optical element B1 is joined to the projection 10 of the holding member 9, the auxiliary portion 8 is joined to the projection 12 of the holding member 11, and the holding members 9 and 11 and the optical element B1 are held in tight contact with each other.

At this time, harmful light rays 13 produced in the optical element B1 are bound to pass through a side surface 14 of the optical element B1 to leave it. However, since the optical element B1 is in tight contact with the holding member 9, the light rays 13 are immediately reflected by the holding member 9 and return to the optical element B1. As a consequence, the harmful light rays 13 may reach the image sensing surface.

Figure 5:
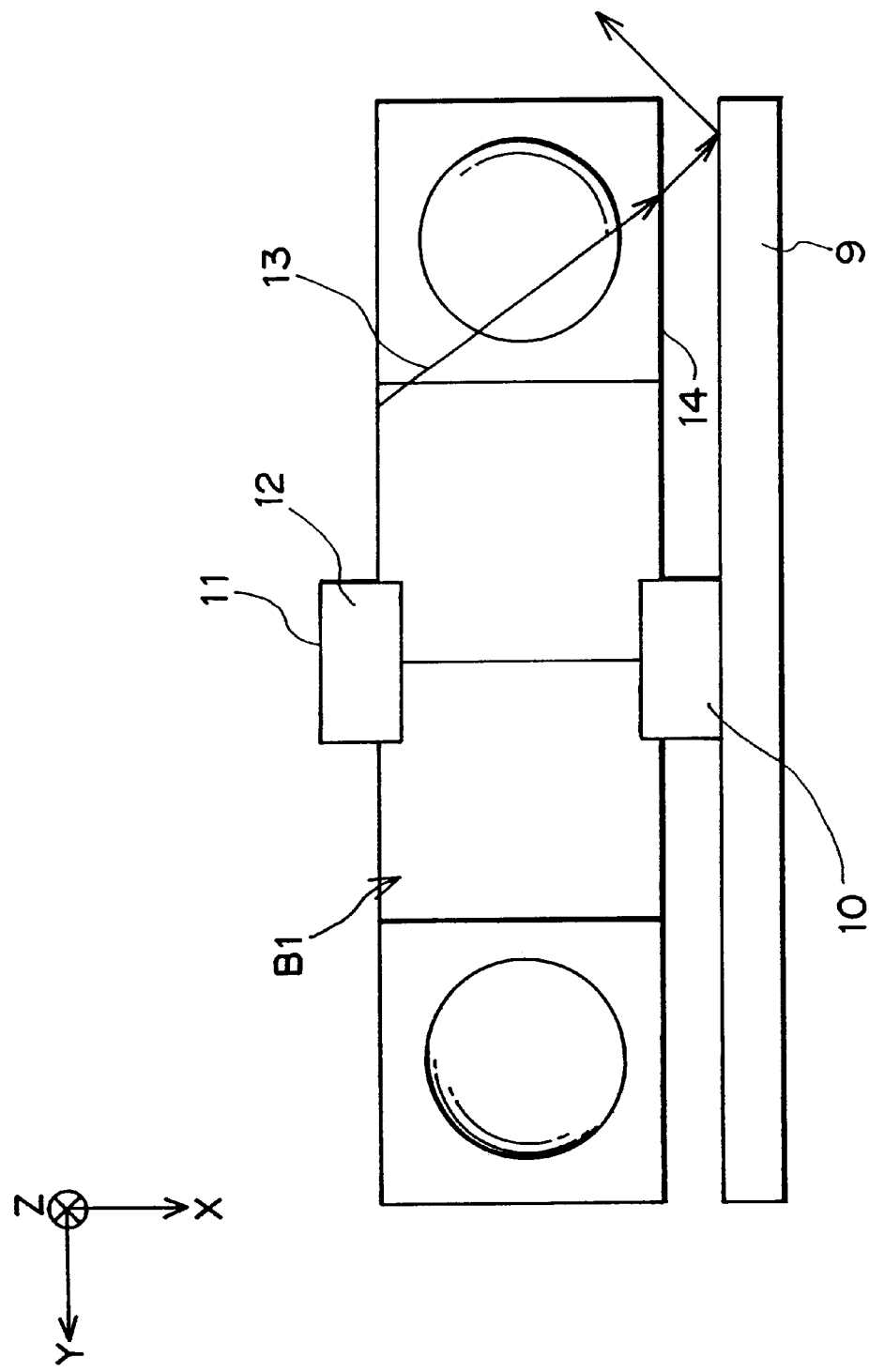
FIG. 5 is a front view showing a case wherein the optical element of the first embodiment is coupled to the holding member to form an optical system.

FIG. 5 is a front view showing a case wherein the optical element of the first embodiment is coupled to the holding members 9 and 11 to form an optical system. In FIG. 5, the holding members and the optical element B1 are separated at a predetermined interval except for the joint portions between the reference portion 7 and the projection 10 of the holding member 9, and between the auxiliary portion 8 and the projection 12 of the holding member 11. More specifically, the height (the height in the X-direction in FIG. 5) of the projection 10 is determined to form a predetermined air gap between the optical element B1 and the holding member 9. When the optical element B1 is held to form an optical system in this manner, the harmful light rays 13 produced inside the optical element B1 pass through the side surface 14 of the optical element 13 and leave the optical element B1, thus preventing the light rays 13 from being reflected by the holding member 9 and re-entering the optical element B1.

[Second Embodiment]

Figure 6:
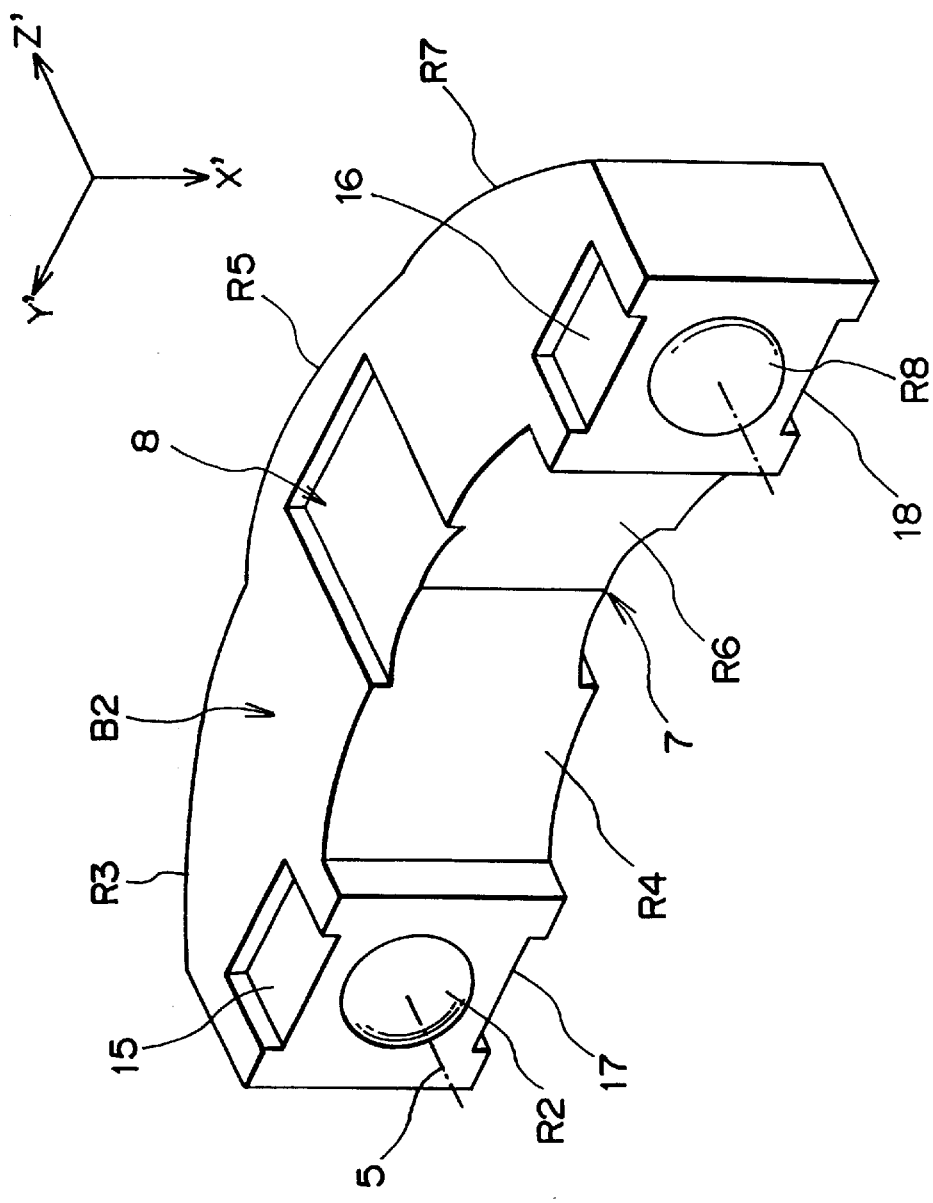
FIG. 6 is a perspective view of an optical element according to the second embodiment of the present invention.

FIG. 6 is a perspective view of an optical element according to the second embodiment of the present invention. In the first embodiment, the optical element is held by one reference portion and one auxiliary portion, while in the second embodiment, a plurality of auxiliary portions are formed, and an optical element can be reliably held with higher precision than in the first embodiment.

As shown in FIG. 6, an optical element B2 of the second embodiment has a reference portion 7 and an auxiliary portion 8 on its two side surfaces as in the first embodiment, and also has four auxiliary portions 15, 16, 17, and 18 at positions separated from the reference and auxiliary portions 7 and 8 on the two side surfaces (forming surfaces).

More specifically, the auxiliary portions 17 and 18 are formed on the formation side of the reference portion 7 of the optical element B2, and the auxiliary portions 15 and 16 are formed on the formation side of the auxiliary portion 8. Furthermore, as in the relationship between the reference and auxiliary portions 7 and 8, the auxiliary portions 15 and 17, and the auxiliary portions 16 and 18 are formed to face each other. With this arrangement, even when the optical element B2 has a complex shape that cannot be held by a pair of reference and auxiliary portions with good balance, the holding area for holding the optical element is increased by the plurality of auxiliary portions, and the optical element B2 can be more securely held with high precision. The plurality of auxiliary portions of the second embodiment strongly assist the position determination of the optical element by the reference portion.

As for other arrangements, the same reference numerals denote the same parts as in the first embodiment, and a detailed description thereof will be omitted.

[Third Embodiment]

Figure 7:
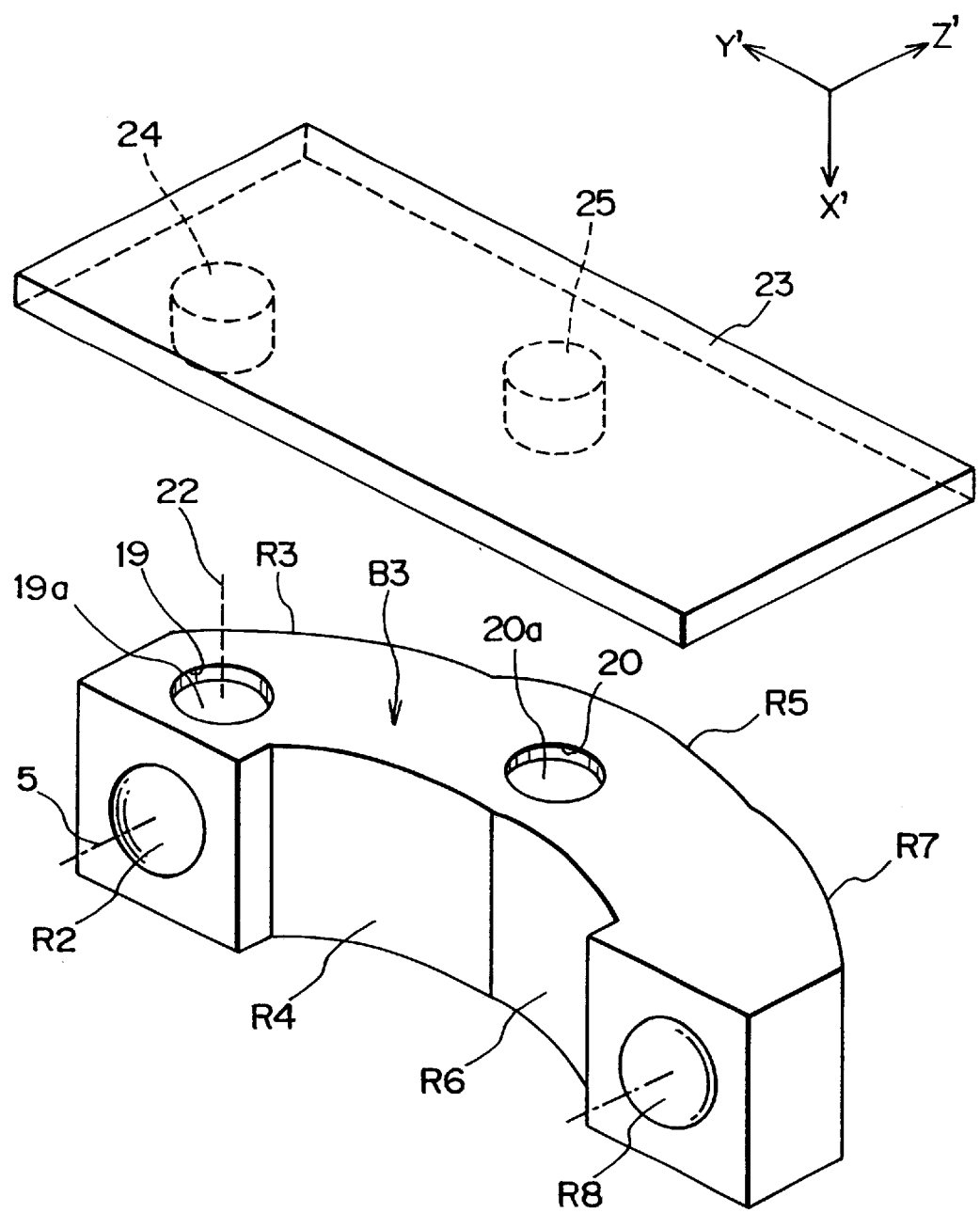
FIG. 7 is a perspective view of an optical element according to the third embodiment of the present invention.

FIG. 7 is a perspective view of an optical element according to the third embodiment of the present invention.

In an optical element B3 of the third embodiment, the reference and auxiliary portions made up of a plurality of surfaces in the above embodiment are made up of round holes or elliptic holes, i.e., hole portions.

In FIG. 7, reference numeral 19 denotes a reference portion formed on the optical element B3, which is a round hole (a hole portion) defined by a flat surface (bottom surface) 19a parallel to the plane (Y'-Z' plane) including the reference axis and a cylindrical surface, a central axis 22 of which is perpendicular to the Y'-Z' plane. Reference numeral 20 denotes an auxiliary portion formed on the optical element B3, which is an elliptic hole (a hole portion) defined by a flat surface 20a parallel to the Y'-Z' plane, and an elliptic cylindrical surface, the central axis of which is perpendicular to the Y'-Z' plane and the major axis direction of which agrees with the Y'-direction.

Reference numeral 23 denotes a holding member which comprises a projection (coupling portion) 24 to be coupled to the reference portion 19, and a projection (coupling portion) 25 to be coupled to the auxiliary portion 20 thereon.

The round hole of the reference portion 19 defines the position of the optical element B3 by defining the X'-axis by the central axis 22 and defining the Y'-Z' plane by the flat surface 19a.

In a method of connecting the optical element B3 of the third embodiment to the holding member 23, the optical element B3 is held on the holding member 23 by fitting or adhering the projection 24 of the holding member 23 and the reference portion 19, and the projection 25 of the holding member 23 and the auxiliary portion 20 to each other.

However, since rotation of the optical element B3 about the X'-axis cannot be restrained by fitting the reference portion 19 onto the projection 24 of the holding member 23 alone, the auxiliary portion 20 is defined by an elliptic hole in the third embodiment, so that the auxiliary portion 20 is fitted on the projection 25 of the holding member 23 to restrain movement in the Z'-direction, thus restraining rotation of the optical element B3 about the X'-axis and coupling the holding member 23 and the optical element B3 more securely.

The reason why the auxiliary portion 20 is defined by an elliptic hole, the major axis direction of which agrees with the Y'-direction is as follows. That is, even when the interval between the reference portion 19 and the auxiliary portion 20 of the optical element B3 in the Y'-direction varies, if the auxiliary portion 20 is defined by the above-mentioned elliptic hole, the optical element B3 can be coupled to the holding member 23 without being deformed while restraining rotation of the optical element B3 about the X'-axis, although the positional relationship between the projection 24 and the auxiliary portion 20 in the Y'-direction shifts.

In the third embodiment, the reference and auxiliary portions are formed on only one side surface of the optical element B3. If the optical element B3 can be securely coupled to the holding member by only one side, no auxiliary portion need be formed on the side surface opposing the reference portion of the optical element B3.

As for other arrangements, the same reference numerals denote the same parts as in the first embodiment, and a detailed description thereof will be omitted.

[Fourth Embodiment]

Figure 8:
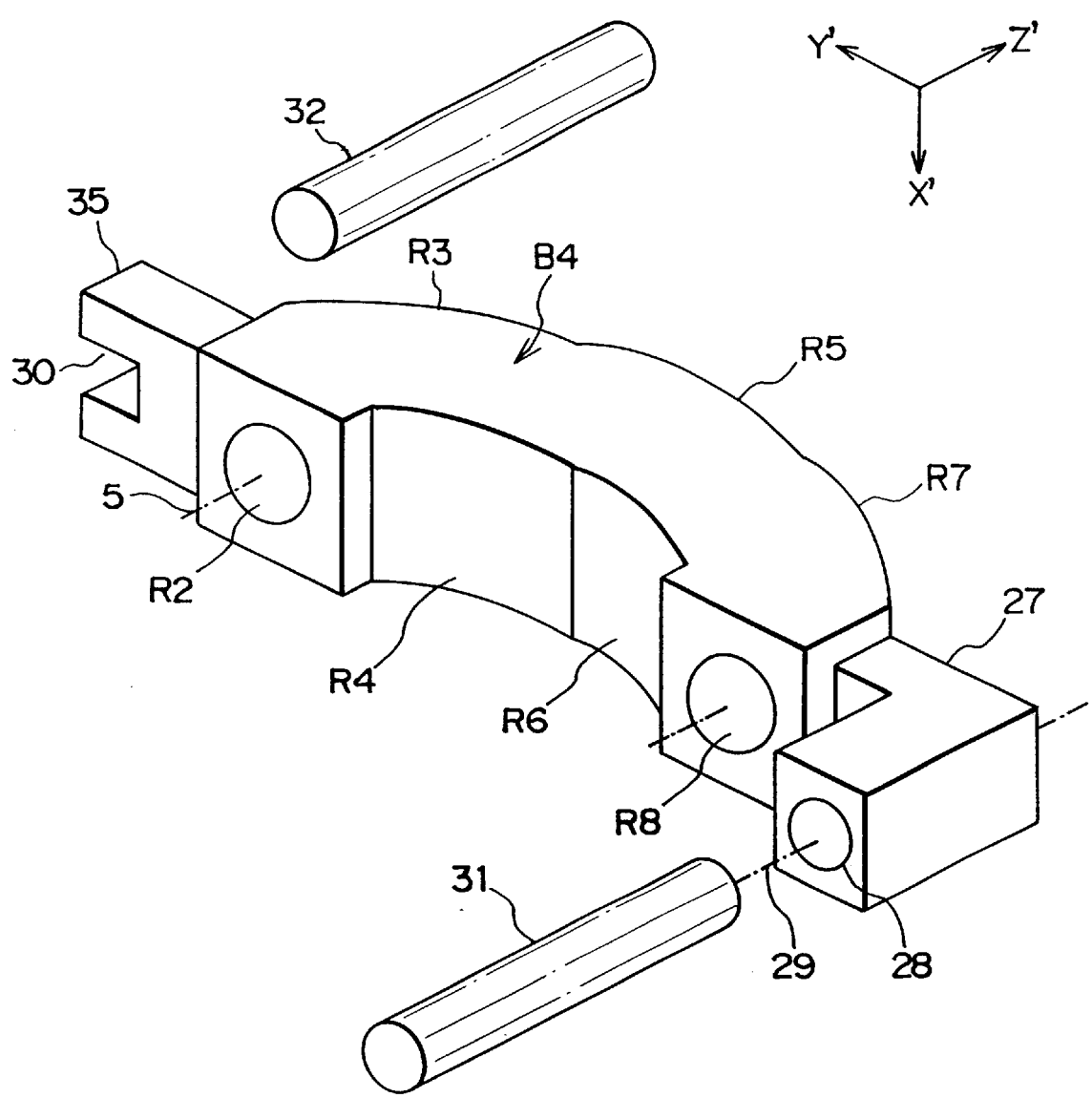
FIG. 8 is a perspective view of an optical element according to the fourth embodiment of the present invention, and an optical system using the same.

FIG. 8 is a perspective view showing an optical element according to the fourth embodiment of the present invention, and an optical system using the same. An optical element B4 of the fourth embodiment is held by guide bars 31 and 32 fixed to a main body (not shown), and is movable for attaining focusing or zooming using these guide bars 31 and 32 to build an optical system. Note that the guide bar 31 and the like constitute a guide means.

In the optical element B4 of the fourth embodiment, a hole portion 28 serving as a reference portion is formed on a sleeve 27 formed on a portion of the element B4, and a guide portion 30 serving as an auxiliary portion is formed on a sleeve 35. A central axis 29 of the hole portion 28 is set to be parallel to the plane (Y'-Z' plane) including the reference axis, and the hole portion 28 is movably fitted onto the guide bar 31, thereby defining the Z'-axis position of the optical element B4.

Since rotation of the optical element B4 about the Z'-axis cannot be restrained by fitting of the hole portion 28 and the guide bar 31 alone, the guide portion 30 of the optical element B4 is movably fitted on the guide bar 32 parallel to the guide bar 31, thereby restraining rotation of the optical element B4 about the Z'-axis and also defining its position on the Y'-Z' plane.

Note that the guide bars 31 and 32 are fixed to be parallel to the Y-Z plane of the absolute coordinate system of the optical system set on the main body, and the Y'-Z' plane matches the Y-Z plane when the optical element B4 is attached to the two guide bars.

The sleeves 27 and 35 may be attached as independent members to the optical element B4 after the optical element B4 is formed. However, in order to obtain a high degree of parallelism between the central axis 29 of the hole portion 28 and the Z'-axis, the sleeves 27 and 35, the reference portion 28, and the auxiliary portion 30 are preferably integrally formed on the optical element B4 in the manufacture of the optical element B4.

With this arrangement, when the optical element B4 is moved for the purpose of focusing or zooming, the parallelism between the guide bar 31 and the optical element B4 can be maintained satisfactorily high.

Furthermore, in the fourth embodiment, since the central axis 29 of the hole portion 28 is set in the Y'-Z' plane, changes in posture upon movement of the optical element B4, especially, changes in posture upon rotation of the optical element B4 about the Y'- and Z'-axes, can be further eliminated.

As for other arrangements, the same reference numerals denote the same parts as in the first embodiment, and a detailed description thereof will be omitted.

[Fifth Embodiment]

Figure 9:
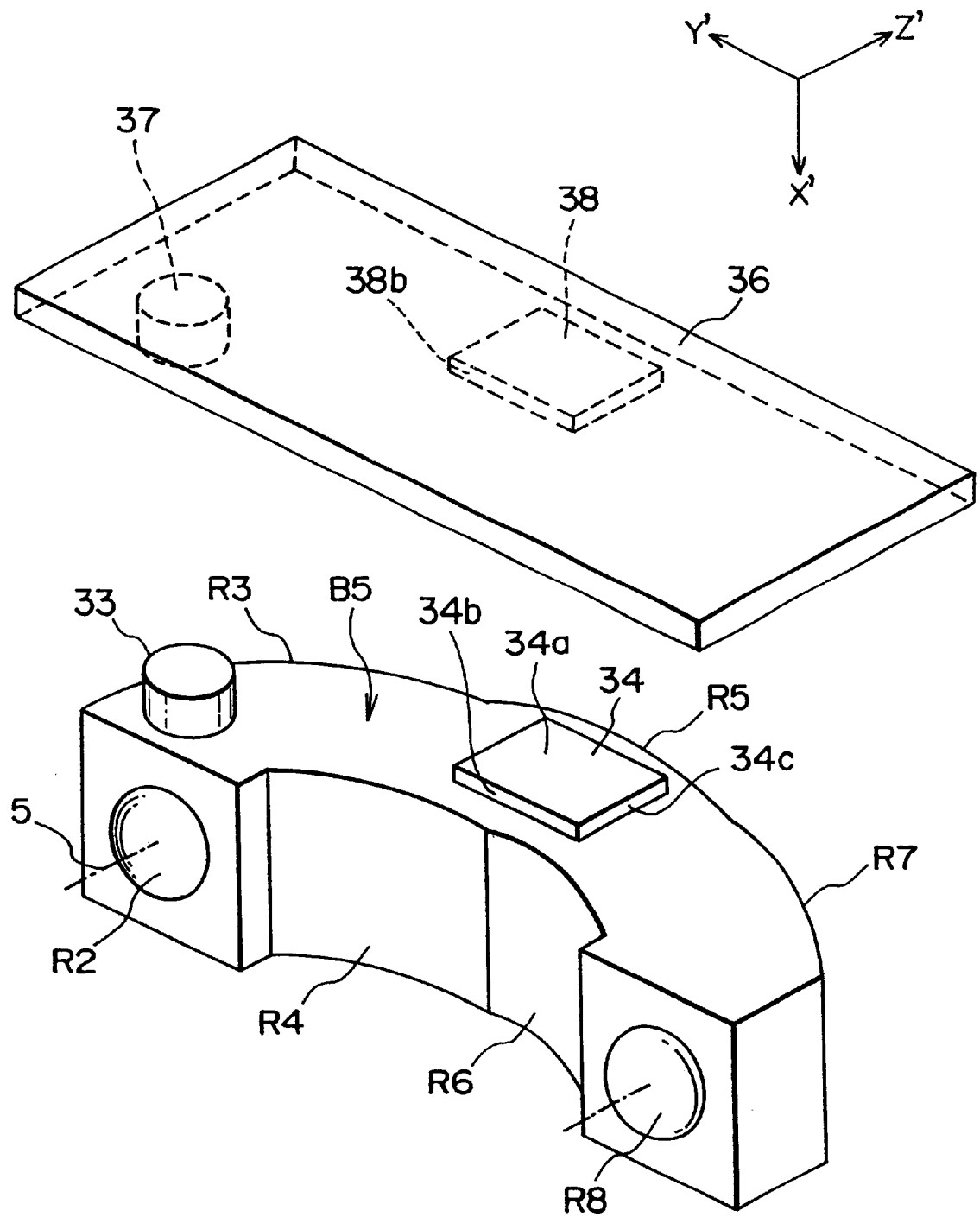
FIG. 9 is a perspective view of an optical element according to the fifth embodiment of the present invention.

FIG. 9 is a perspective view of an optical element according to the fifth embodiment of the present invention. In an optical element B5 of the fifth embodiment, the reference and auxiliary portions of the optical element B1 of the first embodiment are formed by shapes projecting from the side surface (forming surface). In FIG. 9, reference numeral 33 denotes a reference portion, which is a column defined by a cylindrical surface with a central axis perpendicular to the Y'-Z' plane, and a surface parallel to the Y'-Z' plane, and which projects unlike the third embodiment. The reference portion 33 defines the position of the optical element B5.

Reference numeral 34 denotes an auxiliary portion, which is defined by a flat surface 34a parallel to the plane (Y'-Z' plane) including the reference axis 5 of the optical element B5, a flat surface 34b parallel to the X'-Y' plane, a flat surface 34c parallel to the Z'-X' plane, and two more surfaces, and projects from the side surface (forming surface).

Reference numeral 36 denotes a holding member, on which a hole portion (coupling portion) 37 to be coupled to the reference portion 33, and a hole portion (coupling portion) 38 to be coupled to the auxiliary portion 34 are formed.

In a method of connecting the optical element B5 of the fifth embodiment to the holding member 36, the optical element B5 is held on the holding member 36 by fitting or adhering the hole portion 37 of the holding member 36 onto the reference portion 33 contrary to the third embodiment.

However, since rotation of the optical element B5 about the X'-axis cannot be restrained by fitting of the hole portion and the projection alone, in the fifth embodiment, the flat surface 34b of the auxiliary portion 34 is joined to a flat surface 38b of the hole portion 38 formed on the holding member 36, thereby restraining rotation of the optical element B5 about the X'-axis.

Contrary to the above-mentioned embodiment, when the reference portion has a rectangular shape projecting from the side surface (forming surface), the position determination and rotation restrain of the optical element B5 can be attained by only the reference portion without forming any auxiliary portion.

At this time, the reference portion is formed so that the position of the center of gravity of the optical element is located within a region included in a projection of the reference portion in a direction perpendicular to the plane including the reference axis of the optical element. In this manner, the optical element can be held on the holding member with good balance.

As for other arrangements, the same reference numerals denote the same parts as in the first embodiment, and a detailed description thereof will be omitted.

[Sixth Embodiment]

Figure 10:
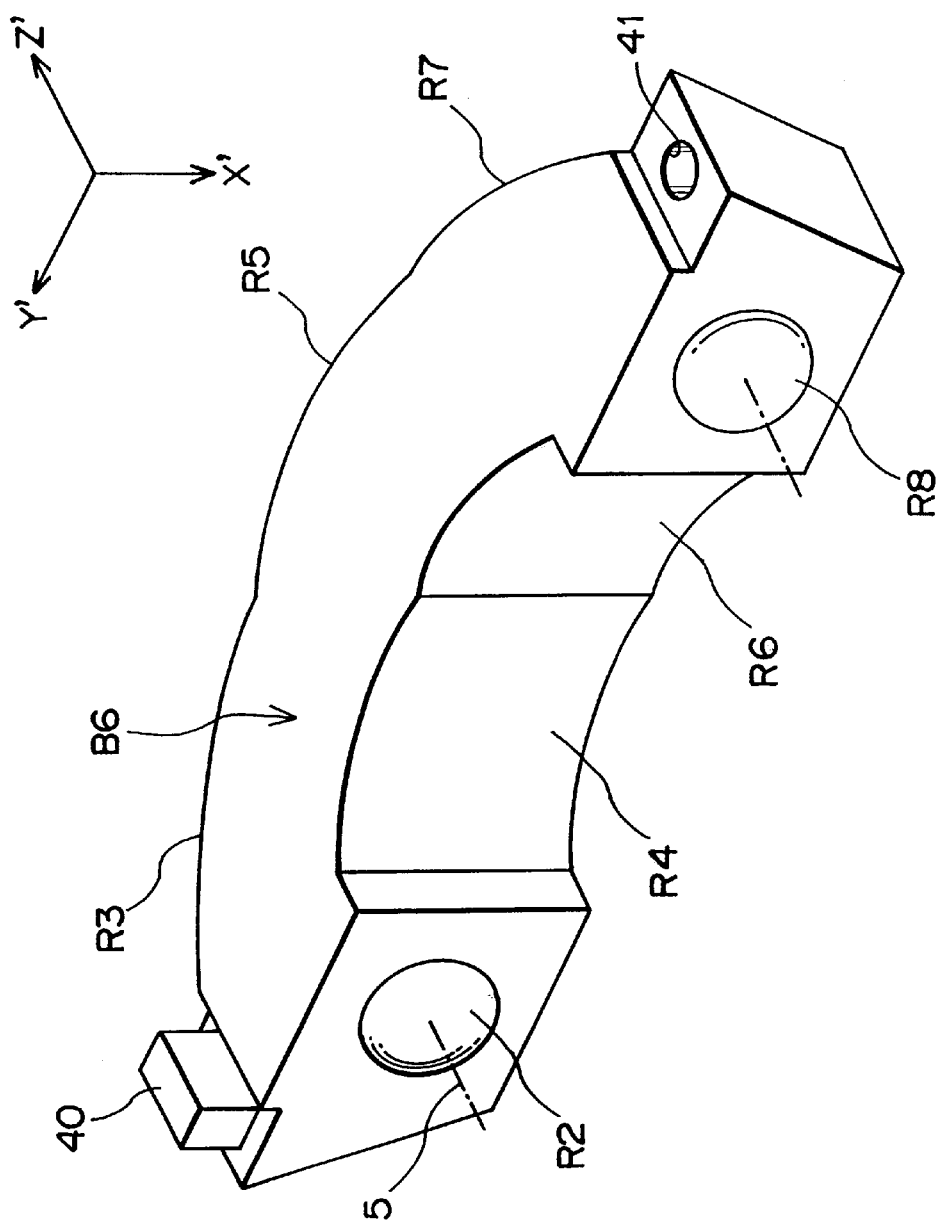
FIG. 10 is a perspective view of an optical element according to the sixth embodiment of the present invention.

FIG. 10 is a perspective view of an optical element according to the sixth embodiment of the present invention. In an optical element B6 of the sixth embodiment, the reference and auxiliary portions of the optical element B1 of the first embodiment are formed as a combination of a hole portion and a projection. More specifically, reference numeral 40 denotes a reference portion formed as a projection; and 41, an auxiliary portion formed as a hole portion. In this manner, the shapes of the reference and auxiliary portions can be appropriately selected in correspondence with situations.

As for other arrangements, the same reference numerals denote the same parts as in the first embodiment, and a detailed description thereof will be ommitted.

The numerical value data of the optical system of this embodiment shown in FIG. 1 will be listed below.

[Numerical Value Data]

Horizontal half field angle = 31.7
Vertical half field angle = 24.8
Stop (aperture) Diameter = 2.0
Image size = horizontal 4 mm × vertical 3 mm

| i | Yi | Zi | θi | Di | Ndi | vdi | |
|---|------|------|--------|------|---------|-------|---|
| 1 | 0.00 | 0.00 | 0.00 | 1.82 | 1 | | stop |

Optical Element B1

| 2 | 0.00 | 1.82 | 0.00 | 7.49 | 1.58310 | 30.20 | refracting surface |
| 3 | 0.00 | 9.30 | 18.49 | 9.86 | 1.58310 | 30.20 | reflecting surface |
| 4 | −5.93 | 1.43 | 3.23 | 9.30 | 1.58310 | 30.20 | reflecting surface |
| 5 | −10.65 | 9.44 | −12.55 | 8.90 | 1.58310 | 30.20 | reflecting surface |
| 6 | −11.50 | 0.58 | −22.91 | 9.39 | 1.58310 | 30.20 | reflecting surface |
| 7 | −18.82 | 6.46 | −25.63 | 8.02 | 1.58310 | 30.20 | reflecting surface |
| 8 | −18.82 | −1.56 | −0.01 | 3.68 | 1 | | refracting surface |
| 9 | −18.82 | −5.24 | −0.01 | 0.00 | 1 | | image surface |

Spherical Surface Shape

R1 surface $R_1 = \infty$
R2 surface $R_2 = -7.648$
R8 surface $R_8 = 10.757$
R9 surface $R_9 = \infty$ Aspherical Surface Shape R3 surface $a = -1.09716e + 01$   $b = -1.25390e + 01$   $t = 2.15145e + 01$
$C_{02} = 0$   $C_{20} = 0$
$C_{03} = 6.87152e - 05$   $C_{21} = 1.21962e - 04$
$C_{04} = 3.59209e - 05$   $C_{22} = 1.02173e - 04$   $C_{40} = 4.95588e - 05$ R4 surface $a = -2.34468e + 00$   $b = 4.88786e + 00$   $t = -3.56094e + 01$
$C_{02} = 0$   $C_{20} = 0$
$C_{03} = -4.48049e - 03$   $C_{21} = -7.45433e - 03$
$C_{04} = 1.81003e - 03$   $C_{22} = 2.09229e - 03$   $C_{40} = -8.28024e - 04$ R5 surface $a = -6.11985e + 00$   $b = 1.70396e + 01$   $t = -2.17033e + 01$
$C_{02} = 0$   $C_{20} = 0$
$C_{03} = -3.23467e - 04$   $C_{21} = -1.07985e - 03$
$C_{04} = -3.70249e - 05$   $C_{22} = -1.74689e - 04$   $C_{40} = -1.21908e - 04$ R6 surface $a = \infty$   $b = \infty$   $t = 0$
$C_{02} = 0$   $C_{20} = 0$
$C_{03} = 1.10097e - 03$   $C_{21} = -3.73963e - 04$
$C_{04} = -1.59596e - 04$   $C_{22} = -3.22152e - 04$   $C_{40} = -1.74291e - 04$ R7 surface $a = -2.11332e + 01$   $b = -1.31315e + 03$   $t = 1.70335e + 00$
$C_{02} = 0$   $C_{20} = 0$
$C_{03} = 8.29145e - 05$   $C_{21} = -1.11374e - 03$
$C_{04} = -2.50522e - 05$   $C_{22} = -5.28330e - 05$   $C_{40} = -2.91711e - 05$ With the above-mentioned arrangement according to the present invention, a planar, low-profile optical element prepared by integrally forming a refracting surface for receiving a light beam, a plurality of reflecting surfaces with curvatures, and a refracting surface for outputting the light beam reflected by the plurality of reflecting surfaces on surfaces of a transparent member, is formed with a reference portion for defining the position of the optical element in a specific direction with respect to a plane including an incident and exit reference axes of at least one reflecting surface of the optical element, or a reference portion for defining the position of the optical element in a specific direction with respect to a plane perpendicular to a reference axis at an intersection between the incident refracting surface or exit refracting surface of the optical element, and the reference axis of the optical element. With this arrangement, an optical element which can define the relative positional relationship among the refracting surfaces and the decentered reflecting surfaces with respect to the reference portions, can improve precision in the manufacture, assembly, and measurements of the optical element, and can prevent deterioration of optical performance, and an optical system using the optical element, can be achieved.

In addition, the present invention has the following effects.

The reference portion of the optical element is made easy to use by limiting the specific direction to a parallel direction and/or a perpendicular direction with respect to the plane.

The optical element is accurately and securely held on the holding member or the like by forming an auxiliary portion for assisting the position determination of the optical element in addition to the reference portion to be parallel or perpendicular to the reference portion, and arranging at least one auxiliary portion to oppose the reference portion.

The holding member and the optical element are satisfactorily held upon holding the optical element by setting the reference and auxiliary portions so that the position of the center of gravity of region sandwiched between the reference and auxiliary portions substantially matches that of the optical element.

The reference portion and/or the auxiliary portion are/is formed on a region other than the light ray effective portion of the optical element, so as to obtain an optical element which suffers less ghost, can prevent the reference portion and/or the auxiliary portion from shielding effective light rays, and can reduce harmful light rays that may be produced by the reference portion and/or the auxiliary portion.

The reference portion and/or the auxiliary portion are/is formed by a plurality of flat surfaces, hole portions, or projections so as to satisfactorily hold and fix the optical element in correspondence with every situations.

A holding member that holds the optical element is designed to move or fix the optical element, and the holding member and the optical element are precisely positioned by forming, on the holding member, portions that fit or join the reference portion and/or the auxiliary portion formed on the optical member.

When the optical element and the holding member for the optical element are fitted or joined to each other, a predetermined air gap is formed between the holding member and the optical element in a region other than the fitting or joining portions, so as to obtain an optical element which suffers less ghost, and can eliminate harmful light rays entering the optical element from the holding member as much as possible.

By integrally forming, on the optical element, a fitting hole for receiving a guide bar for moving the optical element, a high degree of parallelism between the central axis of the fitting hole and the plane including the reference axis can be assured.

By forming, on the optical element, a fitting hole for receiving the guide bar for moving the optical element, and setting the central axis of the fitting hole to be parallel to the incident reference axis of the optical element, changes in posture upon movement of the optical element can be eliminated as much as possible when an optical system is built using the optical element.

By setting the central axis of the fitting hole to be parallel to the incident reference axis of the optical element in the plane including the reference axis of the optical element, changes in posture upon movement of the optical element can be further eliminated when an optical system is built using the optical element.

An embodiment in which the optical device of the present invention is applied to an image sensing device will be explained below. Note that the present invention is not limited to an optical device having a solid-state image sensing device (e.g., a CCD) like in the embodiments, but may be similarly applied to, e.g., a silver halide camera and the like.

[Seventh Embodiment]

Figure 17:
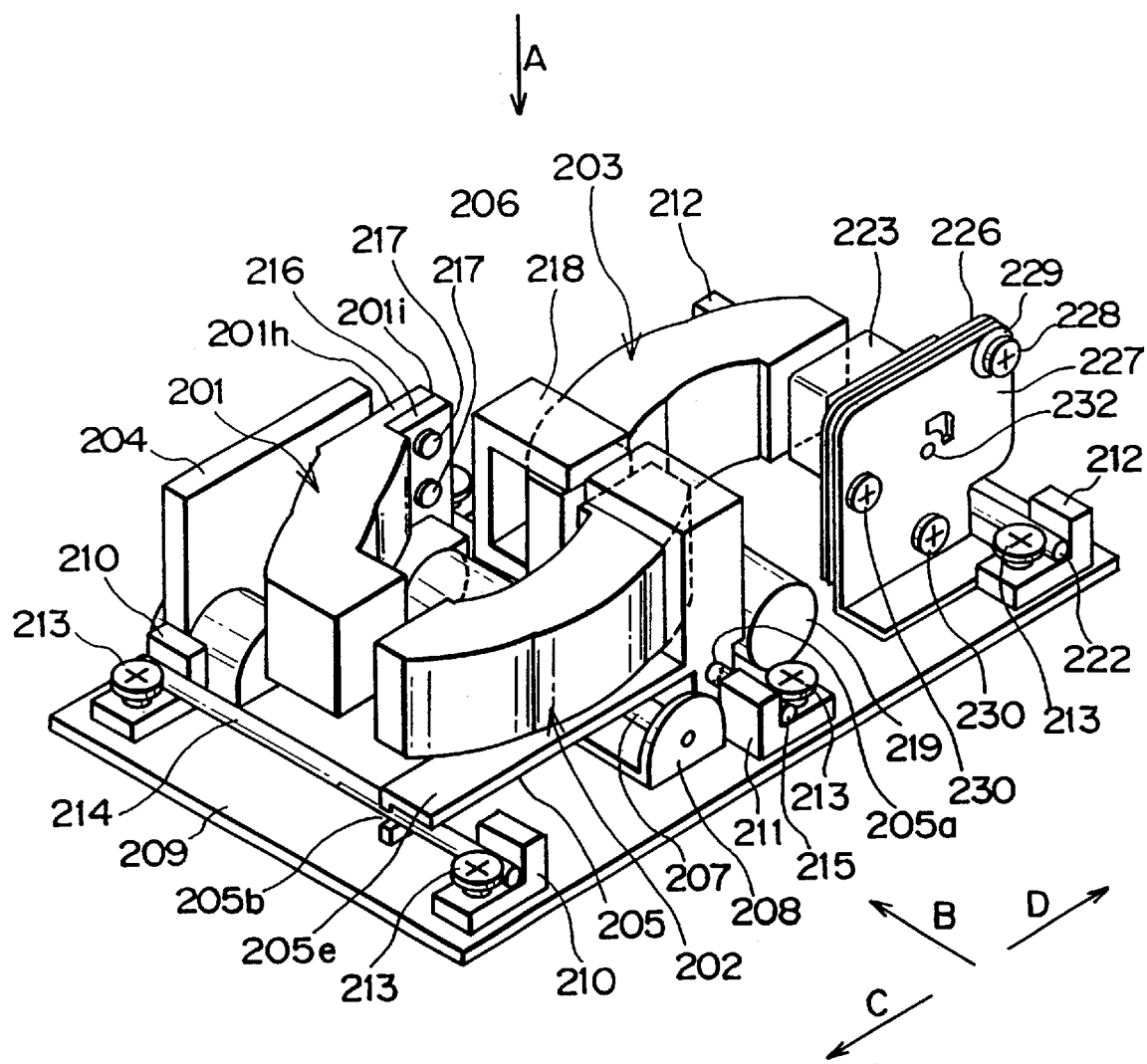
FIG. 17 is a perspective view of an image sensing device according to the seventh embodiment of the present invention.
Figure 18:
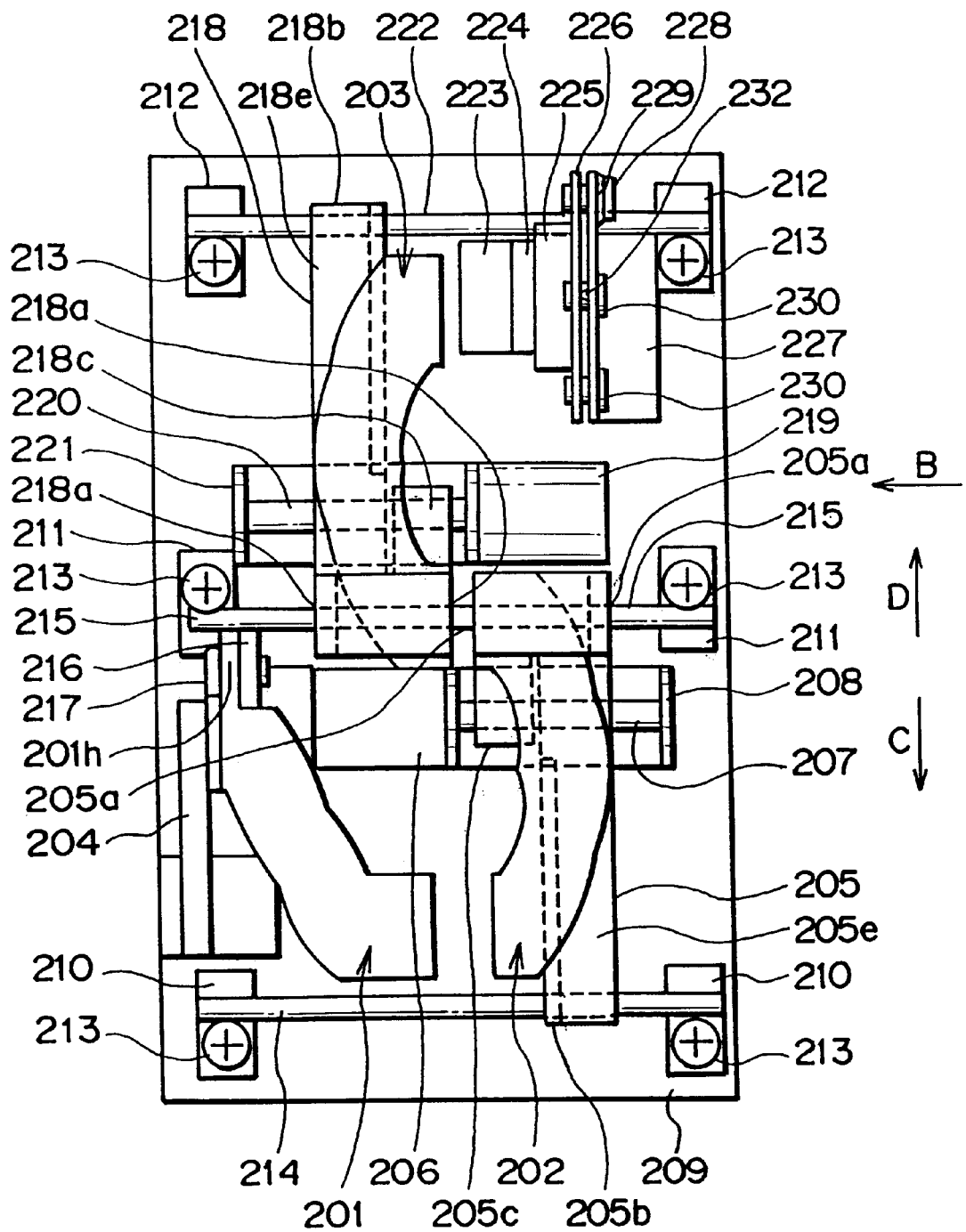
FIG. 18 is a plan view of FIG. 17.
Figure 19:
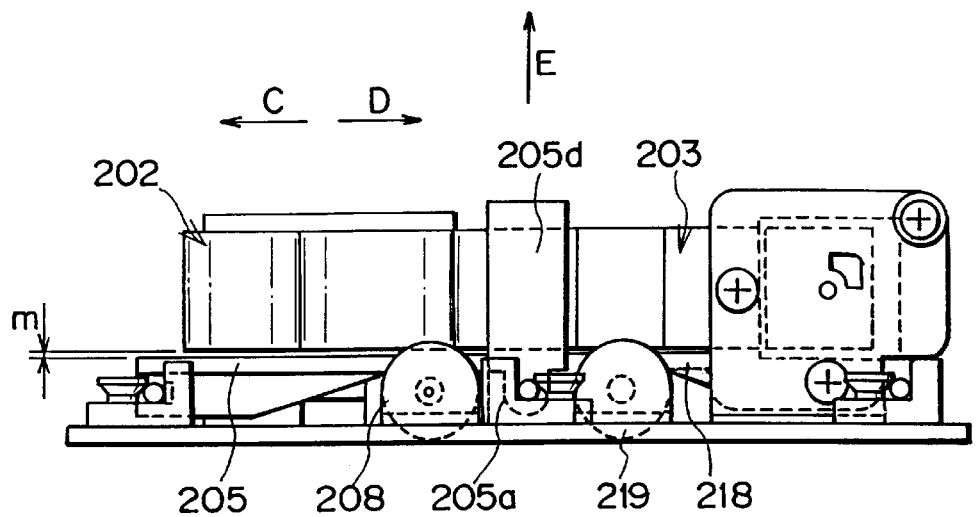
FIG. 19 is a side view of FIG. 17.
Figure 20:
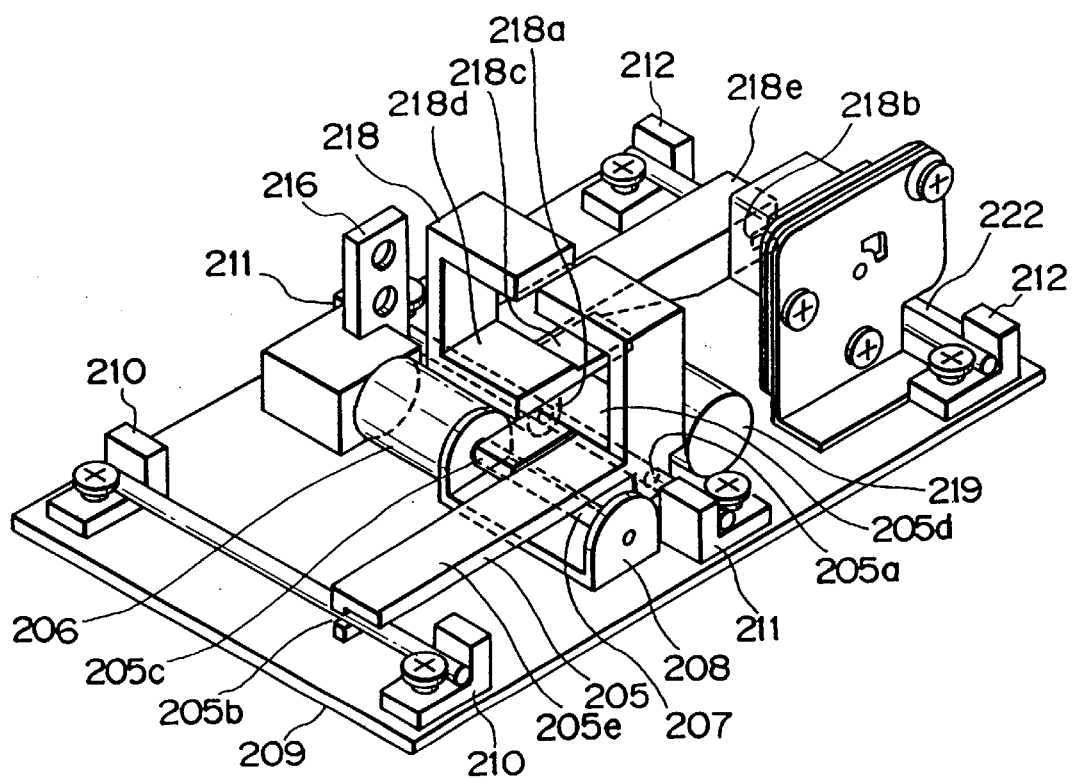
FIG. 20 is a perspective view of the image sensing device excluding first, second, and third optical elements.
Figure 21:
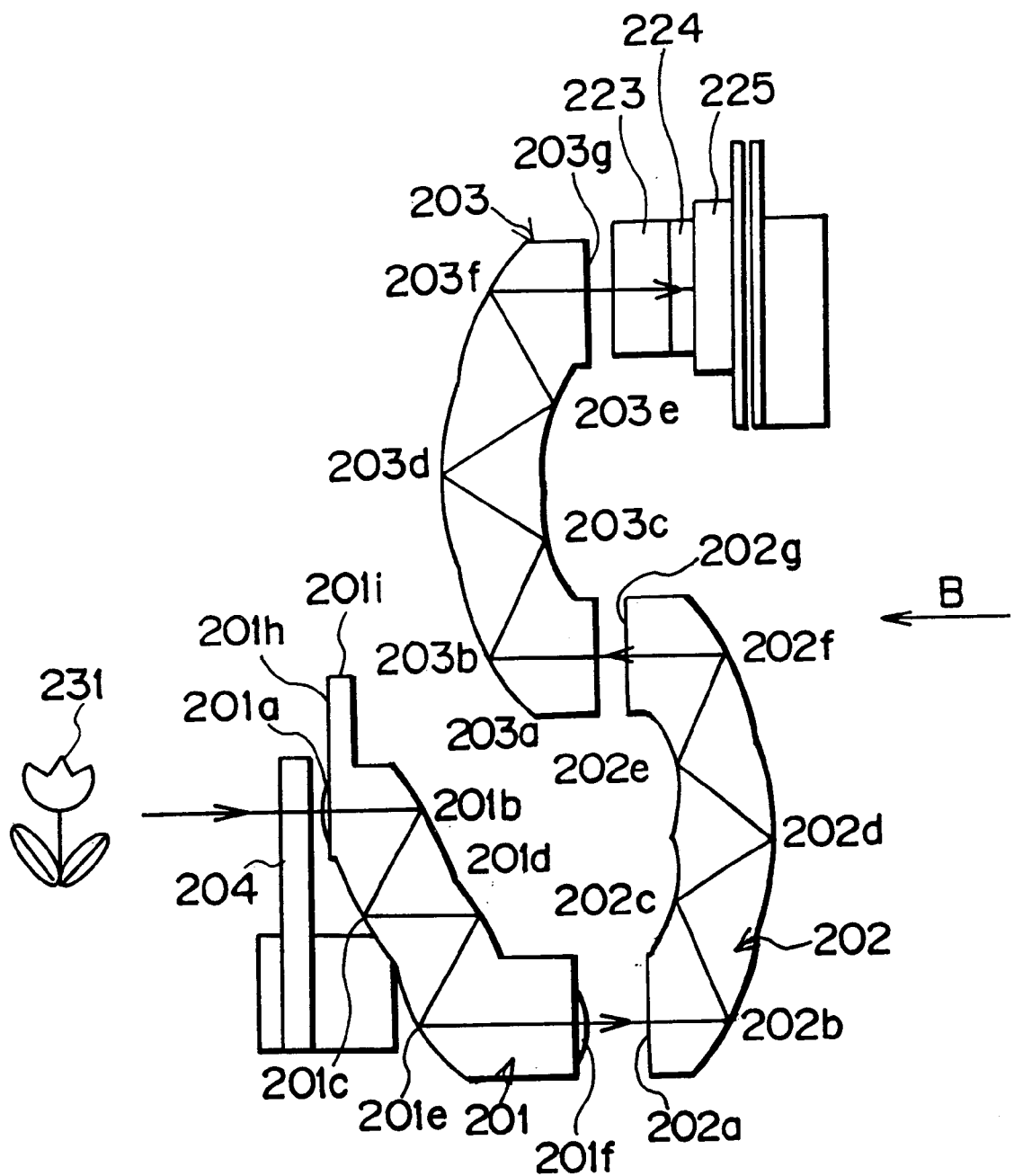
FIG. 21 is a view for explaining the optical axes of incident light and reflected light.
Figure 22:
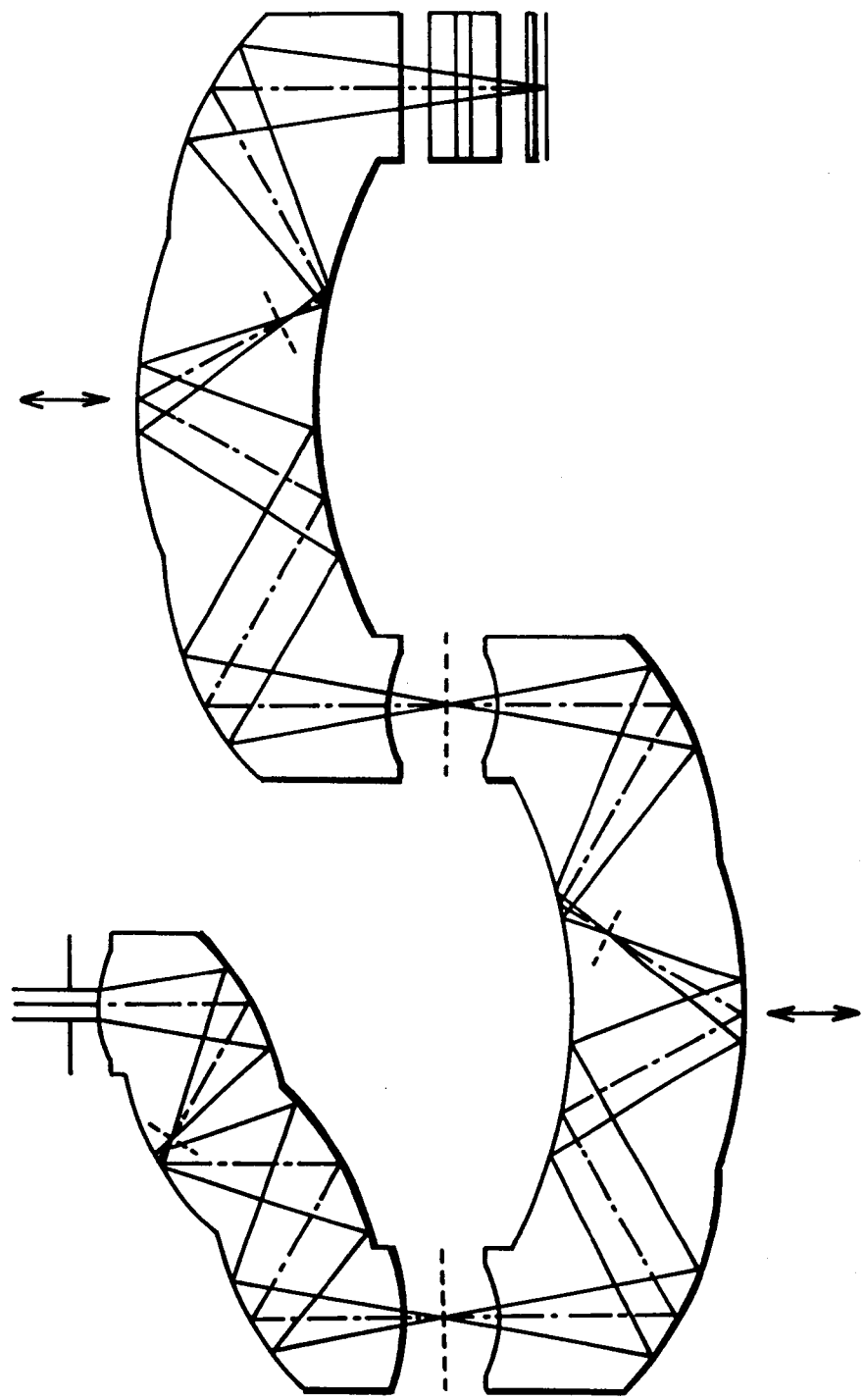
FIG. 22 is a view showing the optical paths of incident light and reflected light.

FIG. 17 is a perspective view showing an image sensing device which uses first, second, and third optical elements according to the seventh embodiment of the present invention. FIG. 18 is a plan view of the device when viewed from a direction A in FIG. 17. FIG. 19 is a side view of the device when viewed from a direction B in FIG. 17. FIG. 20 is a perspective view showing the state wherein the first, second, and third optical elements are removed from the image sensing device shown in FIG. 17, i.e., an explanatory view of various members other than the first, second, and third optical elements mounted on the image sensing device. FIG. 21 is an explanatory view of the reference optical axes of incident light and reflected light. FIG. 22 shows the optical paths of incident light and reflected light.

In FIGS. 17 to 22, reference numeral 201 denotes a first optical element (corresponding to the function of a front lens unit in a conventional lens) which consists of plastic, glass, or the like, and is formed integrally with two refracting surfaces (an incident light surface 201a and an exit light surface 201f in FIG. 21), and four reflecting surfaces (surfaces 201b, 201c, 201d, and 201e in FIG. 21). One end portion 201h of the first optical element 201 is fixed to an attachment portion 216 (see FIG. 20) of a base 209 by attachment screws 217. The first optical element 201 is fixed to the base 209 at its one end portion 201h to absorb expansion and shrinkage due to changes in temperature especially when the element 201 is plastic. As will be described later, second and third optical elements 202 and 203 are fixed to the base at their one-end portions to be free to expand or shrink in their longitudinal directions (nearly the directions of arrows C and D) according to the same idea as the first optical element 201. Since the one-end portions of the first, second, and third optical elements are fixed by screws, stresses produced by fastening the screws do not adversely influence portions (the optical path extending from the incident light surface 201a to the reflecting surface 201b) requiring optical performance. Furthermore, when each optical element of this embodiment is plastic, a gate (an injection port of a molten plastic material upon injection molding) is formed on the side of an end face 201i of its one end portion 201h so as not to adversely influence the portion that requires high optical performance.

Reference numeral 202 denotes a second optical element (corresponding to a variator in the conventional lens) which consists of plastic, glass, or the like, and is formed integrally with two refracting surfaces (an incident light surface 202a and an exit light surface 202g in FIG. 21), and five reflecting surfaces (surfaces 202b, 202c, 202d, 202e, and 202f in FIG. 21). Reference numeral 203 denotes a third optical element (corresponding to a compensator in the conventional lens) which consists of plastic, glass, or the like, and is formed integrally with two refracting surfaces (an incident light surface 203a and an exit light surface 203g in FIG. 21), and four reflecting surfaces (surfaces 203b, 203c, 203d, 203e, and 203f in FIG. 21). Reference numeral 204 denotes a stop mechanism (details are not shown). Reference numeral 205 denotes a first movable base, which has a plurality of fitting holes 205a on its one end portion, and has a U-groove 205b on the other end portion. These fitting holes 205a are fitted on a first guide rail 215 fixed to first guide rail fixing portions 211 of the base 209 by screws 213 without any cluttering, and the U-groove 205b is fitted on a second guide rail 214 attached to second guide rail fixing portions 210 by screws 213 so as to have a certain gap (in the directions of the arrows C and D in FIG. 18). The first movable base 205 is smoothly slidably in the direction of the arrow B and a direction opposite thereto along and with reference to the guide rail 215 by a driving force of a stepping motor 206 (to be described later). The first movable base 205 also has an adhesion portion 205d (see FIG. 20), to which the second optical element 202 is fixed by adhesion, on a portion roughly immediately above the fitting holes 205a (in the direction point out of the page of FIG. 18 or the direction of an arrow E in FIG. 19). The adhesion portion 205d can hold one end portion (exit light side) of the second optical element 202 by adhesion. As shown in FIG. 19, the second optical element 202 and the first movable base 205 are in tight contact with each other on the adhesion portion 205d but a surface 205e (see FIG. 20) other than the adhesion portion 205d has a predetermined step with respect to the adhesion portion 205d. For this reason, a gap m is formed between the optical element 202 and the surface 205e, as shown in FIG. 19. This is to allow the optical element 202 to be free to expand or shrink in the directions of the arrows C and D with reference to the adhesion portion 205d when environmental changes (e.g., changes in temperature R) have taken place, as described above. In this embodiment, the gap m is formed. Alternatively, the adhesion portion 205d may be flush with the surface 205e without forming any gap m, and the optical element 202 may be fixed by adhesion by only the adhesion portion 205d. The first movable base 205 further has a rack portion 205c (see FIGS. 18 and 20), which meshes with a screw shaft 207 of the first stepping motor 206. When the stepping motor 206 is driven by a driving control circuit (not shown), the first movable base 205 and the second optical element 202 fixed thereto by adhesion are fed along the guide rail 215 by the rack portion 205c and the screw shaft 207. Note that the first stepping motor 206 is attached to a first angle 208, which is fixed to the base 209.

In this embodiment, a stepping motor is used as the driving source. However, the present invention is not limited to this, and any other driving sources such as a DC motor, an ultrasonic wave motor, a voice coil driving device, and the like may be used as long as they can drive the first movable base 205 and the second optical element 202.

Reference numeral 218 denotes a second movable base, the structure of which is substantially the same as that of the first movable base 205. The second movable base 218 has fitting holes 218a on its one end portion, and a U-groove 218b similar to the groove 205b (see FIG. 20) on the other end portion. The fitting holes 218a are fitted on the first guide rail 215 attached to the first guide rail fixing portions 211 of the base 209 without any cluttering, and the U-groove 218b is fitted on a third guide rail 222 attached to third guide rail fixing portions 212 of the base 209 by screws 213, so as to have a certain gap in the directions of the arrows C and D in FIG. 18. As in the first movable base 205, the second movable base 218 can smoothly move along and with reference to the first guide rail 215.

The common guide rail 215 is used to serve as a reference since the following merits and are expected as compared to using independent guide rails 215.

The second and third optical elements 202 and 203 move in the direction of the arrow B in FIG. 18 and a direction opposite thereto so as to attain zooming. In this case, a high-performance zoom mechanism requires that the exit optical axis from the second optical element 202 and the incident optical axis to the third optical element 203 (an optical axis of the reflecting surface 202f to the reflecting surface 203b shown in FIG. 21 to be described later) always agree with each other during movement of the optical elements 202 and 203 and at a stop position after movement. If independent guide rails 215 are used, the optical axes may not agree with each other due to assembly precision errors, parts variations, and the like, thus adversely influencing the performance. If a common guide rail 215 is used, such problem can be solved.

A cost reduction can be attained by reducing the number of parts, the number of assembly steps, and the like.

The second movable base 218 has an adhesion portion 218d for fixing the third optical element 203 by adhesion on a portion roughly immediately above the fitting holes 218a, and the adhesion portion 218d can hold one end portion (incident light side) of the third optical element 203 by adhesion. Note that as in the first movable base 205, a predetermined step is formed between the adhesion portion 218d and a surface 218e other than the adhesion portion 218d. This step also serves to absorb environmental changes (e.g., changes in temperature). Furthermore, the second movable base 218 has a rack portion 218c (see FIGS. 18 and 20) as in the first movable base 205, which portion meshes with a screw shaft 220 of a second stepping motor 219. When the second stepping motor 219 is driven by a driving control circuit (not shown), the second movable base 218 and the third optical element 203 adhered thereto are fed along the guide rail 215 by the second stepping motor 219 and the screw shaft 220. Note that the second stepping motor 219 is attached to a second angle 221, which is fixed to the base 209.

Reference numeral 223 denotes an optical low-pass filter; 224, an IR (infrared ray) blocking filter; and 225, a CCD (solid-state image sensing device), which are known means required for converting optical information into an electrical signal, and are used for converting optical information which has passed through the first, second, and third optical elements 201, 202, and 203 into an electrical signal, as shown in FIG. 21. Note that the optical low-pass filter 223, IR blocking filter 224, and CCD 225 normally have a predetermined structure, and are integrally coupled and attached. However, this structure is not shown. Also, the CCD 225 is normally connected to a signal processing circuit, but this portion is not shown, either. Reference numeral 226 denotes a CCD attachment plate to which the CCD 225 is attached; 227, an angle for attaching these members to the base 209; and 232, a projection (see FIG. 18; it seems recessed in the direction of the arrow B in FIG. 17) formed by drawing the angle 227 in the direction of the arrow B in FIG. 17. The CCD attachment plate 226 is coupled to the angle 227 to abut against the projection 232 by screws 230 and a screw 228 via a spring washer 229. This structure is used to adjust the tilt angle of the CCD 225 so that light can enter the CCD 225 at a predetermined incident angle, when light leaving the exit surface 203g of the third optical element 203 cannot enter the CCD 225 in a direction perpendicular to the surface of the CCD 225 due to parts precision errors, assembly errors, and the like. That is, the screws 228 and 230 are appropriately fastened or loosened to determine the position of the CCD 225 about the projection 232 as a fulcrum.

The reason why the second optical element 202 is fixed by adhesion to a position roughly immediately above the fitting hole 205a of the first movable base 205 (roughly immediately below the exit optical axis from the second optical element 202; each optical axis extends along one plane in FIG. 21, and a first guide rail 215 is present in or in the vicinity of a plane which crosses that plane at a position of the optical axis of the reflecting surface 202f to the reflecting surface 203b, and is perpendicular to that plane, and is nearly parallel to the optical axis of the reflecting surface 202f to the reflecting surface 203b), and the third optical element 203 is fixed by adhesion to a position roughly immediately above the fitting hole of the second movable base 218 (roughly immediately below the incident optical axis of the third optical element 203) will be explained below.

As described above, both the movable bases 205 and 218 that respectively hold the second and third optical elements 202 and 203 are fitted on the first guide rail 215, and are movable along it.

When ambient temperature changes, the optical element 202 expands or shrinks. Since the exit optical axis (light rays leaving the reflected surface 202f in FIG. 21) side of the optical element 202 is adhered to the adhesion portion 205d of the first movable base 205 roughly immediately above the fitting holes 205a, it expands in the direction of the arrow C or shrinks in the direction of the arrow D in FIG. 18 with reference to that adhered portion. On the other hand, since the incident optical axis (light rays entering the surface 203a in FIG. 21) of the third optical element 203 is adhered to the adhesion portion 218d of the first movable base 205 roughly immediately above the fitting holes 218a, it expands in the direction of the arrow D or shrinks in the direction of the arrow C in FIG. 18 with reference to that adhered portion. That is, the two optical elements can expand or shrink in opposite directions with reference to the first guide rail 215. Since the exit optical axis from the second optical element 202 and the incident optical axis to the third optical element (the optical axis extending from the surface 202f to the surface 203b in FIG. 21) is present roughly immediately above the guide rail 215, these two optical elements 202 and 203 expand or shrink in opposite directions with reference to the exit optical axis from the second optical element 202 and the incident optical axis to the third optical element 203. As a consequence, light leaving the second optical element 202 can always be launched on an identical position of the incident light surface 203a (see FIG. 21) without being influenced by changes in temperature.

On the other hand, since the first optical element 201 is fixed to the attachment portion 216 from the base 209 at its one end portion 201h close to the first guide rail 215, it expands in nearly the direction of the arrow C or shrinks in the direction of the arrow D with reference to its one end portion 201h. Such expansion and shrinkage take place in the same directions as those of the second optical element 202. Also, in the first optical element, the length in the direction of the arrow C from the position of the attachment screw 217 to the exit light surface 201f is about 40 mm, while in the second optical element 202, the size in the direction of the arrow C from the adhered portion (the position of the exit optical axis from the surface 202f) to the incident light surface 202a is about 45 mm, i.e., the difference between these sizes is small. Hence, the two optical elements have substantially equal expansion/shrinkage amounts due to changes in temperature. With this structure, light leaving the exit light surface 201f strikes a substantially identical position on the incident light surface 202a of the second optical element 202 without being influenced by changes in temperature. That is, the above-mentioned structure can prevent optical performance from deteriorating due to changes in temperature.

Note that the position of light leaving the third optical element 203 (i.e., light rays coming from the surface 203f) shifts in the direction of the arrow C or D in FIG. 18 due to changes in temperature. However, no serious problem is posed since these light rays enter the CCD 225 which does not particularly require high attachment precision in the directions of the arrows C and D with respect to the third optical element 203 (the precision can be low).

The layout of the stepping motors 206 and 219 will be explained below.

In FIG. 18, the first stepping motor 206 is arranged at a position surrounded by the first, second, and third optical elements 201, 202, and 203. On the other hand, the second stepping motor 219 is arranged at a position surrounded by the second and third optical elements 202 and 203, and the CCD 225. These places correspond to dead spaces in the layout of the optical elements, and when stepping motors are installed at these places, the overall space factor can be improved, thus contributing to a size reduction of the device. Furthermore, these positions correspond to the vicinities of the first guide rail 215 serving as a reference upon movement of the first and second movable bases 205 and 218, and can minimize twisting or the like produced upon movement of the individual movable bases. Hence, the optical elements can be moved with high precision.

Since the first guide rail 215 serving as a reference is arranged in the vicinity of light that leaves the second optical element 202 and light that enters the third optical element 203 (an identical optical axis, i.e., the optical axis of the surface 202f to the surface 203b), the adverse influences of cluttering or the like upon zoom movement on the optical axis of the surface 202f to the surface 203b can be minimized. Note that a common guide rail may be arranged in the vicinity of the optical axis of the surface 201e to the surface 202b in FIG. 21, but is preferably arranged in the vicinity of the optical axis of the surface 202f to the surface 203b for the following reason.

That is, the first optical element 201 is fixed in position; it does not move. On the contrary, the second and third optical elements 202 and 203 always move upon zooming. More specifically, when the guide rail 215 serving as a reference is arranged in the vicinity of the optical axis of the surface 202f to the surface 203b that suffers many variation factors due to cluttering and the like, the variation factors can be suppressed, and a zoom mechanism with higher precision can be realized.

The operation for fetching an image by the CCD 225 in the above-mentioned arrangement will be described below with reference to FIG. 21. Note that FIG. 21 illustrates only the optical path of chief light rays, the behavior of the entire light beam is disclosed in, e.g., Japanese Patent Application Nos. 7-65109 and 7-123256, and a detailed description thereof will be omitted.

In FIG. 21, image information of an object 231 is incident on the incident light surface 201a of the first optical element 201. Since the first optical element 201 consists of plastic, glass, or the like, as described above, the image information is refracted by the refracting power of the incident light surface 201a upon incidence. In this case, a driving control circuit (not shown) drives the stop mechanism 204 on the basis of brightness information from a light amount detection mechanism (not shown) to adjust the incident light amount to be a predetermined value. The light entering the incident light surface 201a is reflected in turn by the reflecting surfaces 201b, 201c, 201d, and 201e, and leaves the first optical element 201 after it is similarly refracted by the refracting power of the exit light surface 201f. The light then becomes incident on the incident light surface 202a of the second optical element 202. In this case, the light is refracted by the refracting power of the surface 202a. The light is reflected in turn by the reflecting surfaces 202b, 202c, 202d, 202e, and 202f of the second optical element 202, and leaves the second optical element 202 after it is refracted by the refracting power of the exit light surface 202g. This light enters the third optical element 203 after it becomes refracted light by the incident light surface 203a of the third optical element 203, is reflected in turn by the surfaces 203b, 203c, 203d, 203e, and 203f, and leaves the third optical element 203 from the exit light surface 203g as refracted light. The light from the exit light surface 203g passes through the low-pass filter 223 and the IR blocking filter 224, and forms an image on the CCD 225. The image information from the CCD 225 is processed by a signal processing circuit or the like (not shown), and is finally displayed on a display device (not shown). The operator who observes the displayed image operates an operation device (not shown) to adjust the object image to a desired field angle. This operation corresponds to that of a zoom switch toward the telephoto or wide-angle side in a conventional video camera or electronic still camera. In general, autofocusing is done after zooming, but its control method is a state-of-the-art technique. Furthermore, during this interval, a control unit (not shown) controls the stop mechanism 204 to obtain desired lightness.

The control of the second and third optical elements 202 and 203 upon operation of the zoom switch by the operator will be explained below.

When the operator operates the zoom switch toward the telephoto side, the stepping motors 206 and 219 (see FIG. 18) rotate in a predetermined direction in accordance with a control signal from a control unit (not shown). At the same time, the screw shafts 207 and 220 are rotated. Since the screw shafts 207 and 220 respectively mesh (threadably fit) with the rack portion 205c of the first movable base 205 and the rack portion 218c of the second movable base 218, the second and third optical elements 202 and 203 move by a predetermined amount in the direction of the arrow B in FIGS. 17, 18, and 21. When the operator stops the operation at an appropriate position, the first or second movable base 205 or 218 is controlled to move by a very small amount in the direction of the arrow B or a direction opposite thereto, thus bringing a focal point on the CCD 225. Note that the state illustrated in FIGS. 18 and 21 is close to the wide-angle side. When the zoom switch is operated from this state toward the wide-angle side, the second and third optical elements 202 and 203 move in the direction opposite to the direction of the arrow B, but their moving amount is smaller than that when they move toward the telephoto side. FIG. 22 is an optical path diagram of light rays by the optical elements of this embodiment, and illustrates, as an example, the propagation state of light rays while forming images inside the optical elements. Note that the behavior of a light beam upon movement of a plurality of optical elements each having a plurality of refracting surfaces and a plurality of reflecting surfaces by the telephoto/wide-angle operation is described in, e.g., Japanese Patent Application Nos. 7-65109 and 7-123256, and a detailed description thereof will be omitted.

Note that the stop mechanism 204 is subjected to predetermined control by a predetermined control signal during such zoom operations, needless to say. Furthermore, when the image sensing device is an electronic still camera, since a shutter is required, the stop mechanism 204 may be provided with a shutter function, a CCD with a shutter function may be mounted, or a shutter may be added.

As described above, according to this embodiment, in an optical device having an optical element in which a light beam is incident from one refracting surface, is reflected by a plurality of reflecting surfaces, and departs from the element from another refracting surface, the optical performance can be prevented from deteriorating due to stress upon fixing the optical element and changes in temperature.

Also, according to this embodiment, in an optical device which comprises a zoom optical system having a plurality of optical elements in each of which a light beam is incident from one refracting surface, is reflected by a plurality of reflecting surfaces, and leaves the element from another refracting surface, and a driving means for driving the zoom optical system to attain zooming, the following effects i to iv can be obtained.

i. The individual optical elements are fixed to the corresponding movable bases on the side of an optical axis where light leaving one optical element enters the other optical element, and a common reference guide rail is used for the movable bases and is arranged in the vicinity of the optical axis.

As a result, the adverse influences of expansion/shrinkage of the optical elements arising from changes in temperature and resulting changes in refracting power on image quality can be removed.

ii. Since the individual optical elements are fixed to the corresponding movable bases at their one-end side and at the side of the optical axis, adverse influences on image quality can be similarly removed.

iii. When the thermal expansion coefficient of the optical elements assumes a value close to that of the movable bases to which the optical elements are attached, the attachment position of one optical element to the first movable base, and that of the other optical element to the second movable base are determined to be symmetrical about the common reference guide, thereby similarly removing adverse influences on image quality.

iv. The fixing position of the stationary first optical element to the base, and the fixing positions of the movable second and third optical elements to the first and second movable bases are set on the reference guide rail side, thereby similarly removing adverse influences on image quality.

According to this embodiment, dead spaces can be effectively used to achieve a size reduction of an image sensing device that comprises a zoom optical system in which a light beam is incident from one refracting surface, is reflected by a plurality of reflecting surfaces, and leaves the element from another refracting surface, and a driving means for driving the zoom optical system to attain zooming.

Furthermore, according to this embodiment, the following effects v and vi can be obtained.

v. In the arrangement that attains zooming by moving two optical elements in an identical optical axis direction in which the exit optical axis from one element integrally formed with a plurality of refracting surfaces and a plurality of reflecting surfaces becomes the incident optical axis of the other similar optical element, a common guide rail for moving these elements is arranged in the vicinity of the identical optical axis, thus enabling high-precision zoom driving.

vi. Since the optical elements are driven in the vicinity of a guide rail, twisting or the like can be suppressed from being produced, and high-precision feeding can be realized.

[Eighth Embodiment]

Figure 23:
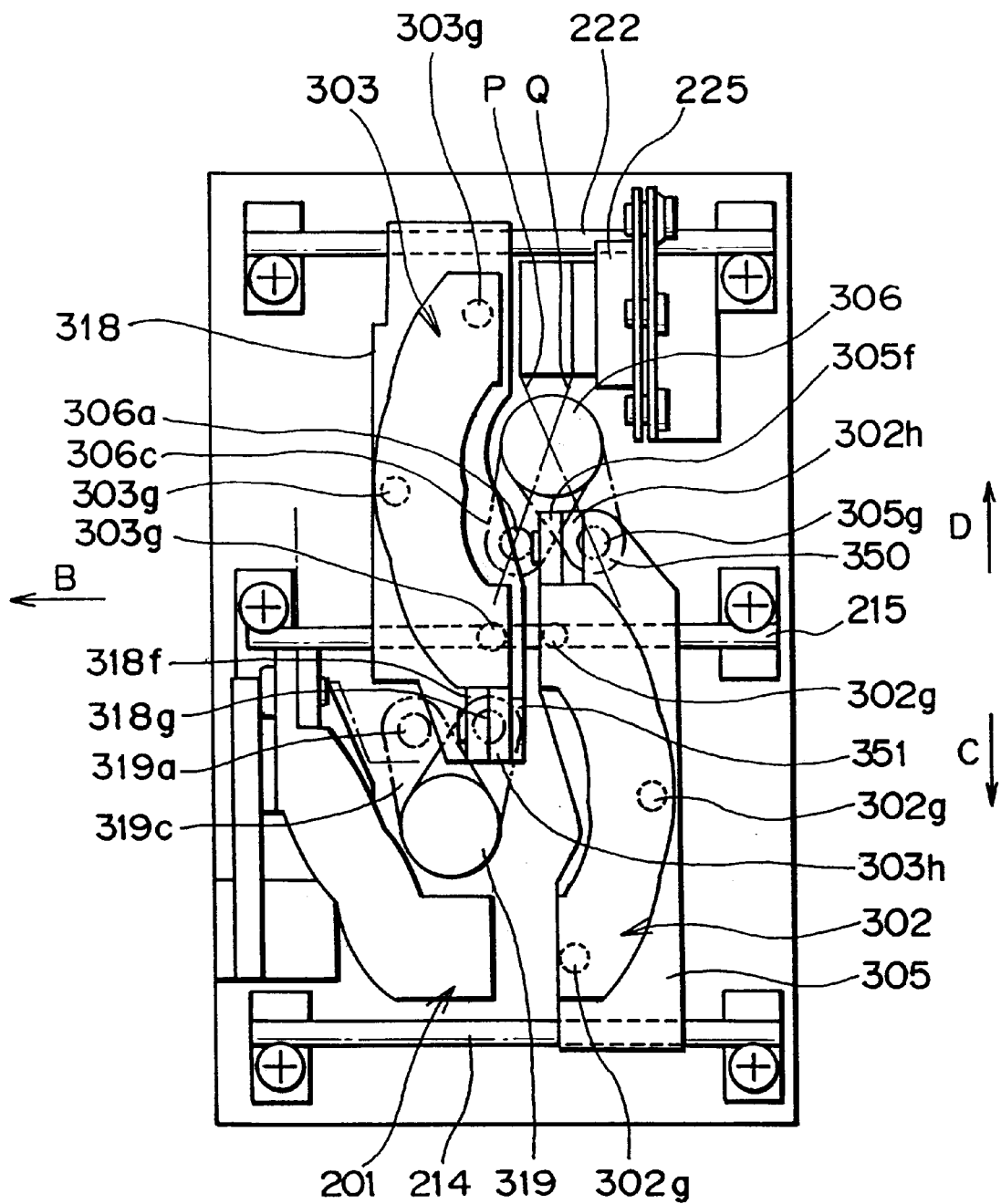
FIG. 23 is a perspective view of an image sensing device according to the eighth embodiment of the present invention.
Figure 24:
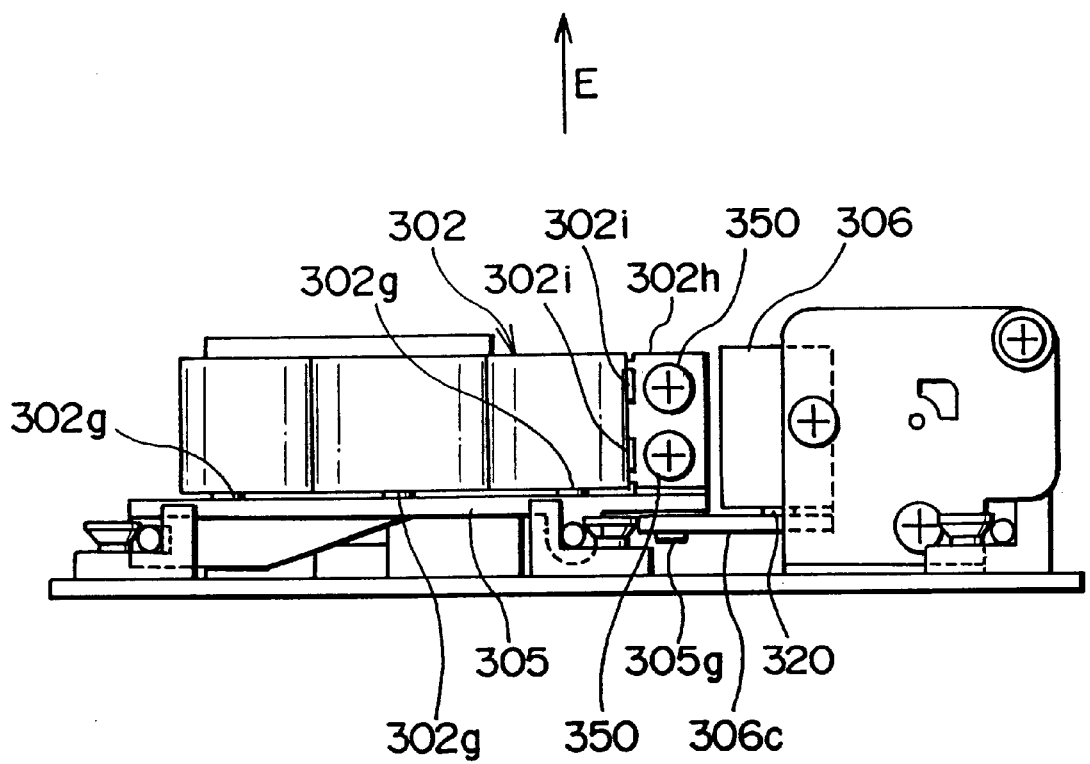
FIG. 24 is a side view of FIG. 23.

FIG. 23 is a plan view of an image sensing device according to the eighth embodiment of the present invention. FIG. 24 is a side view of FIG. 23. FIGS. 23 and 24 respectively correspond to FIGS. 18 and 19 of the seventh embodiment. In the seventh embodiment, the second and third optical elements 202 and 203 are moved using the stepping motors 206 and 219 and the screw shafts 207 and 220. However, in this embodiment, a cam feed mechanism is adopted, and the layout of the stepping motors is changed. Such modifications are made to improve the space factor as compared to the seventh embodiment and, more specifically, to decrease the thickness of the mechanical structure. Furthermore, the attachment methods of the second and third optical elements 202 and 203 are changed. Note that the same reference numerals in FIGS. 23 and 24 denote the same parts as in the seventh embodiment, and a detailed description thereof will be omitted.

Reference numeral 301 denotes a first optical element (corresponding to reference numeral 201 in FIG. 17); and 302, a second optical element (corresponding to reference numeral 202 in FIG. 17). The difference from the seventh embodiment is that an attachment portion 302h is formed on one end portion of the second optical element 302. As described above, this structure is exploited to prevent stress produced upon fastening the screws from adversely influencing the optical performance. In this embodiment, the shape is improved, and the attachment portion 302h is formed on the second optical element 302 to sandwich slits 302i therebetween (see FIG. 24). This attachment portion 302h is fixed to an upright portion 305f of a first movable base 305 (corresponding to reference numeral 205 in FIG. 17) by screws 350.

Figure 25:
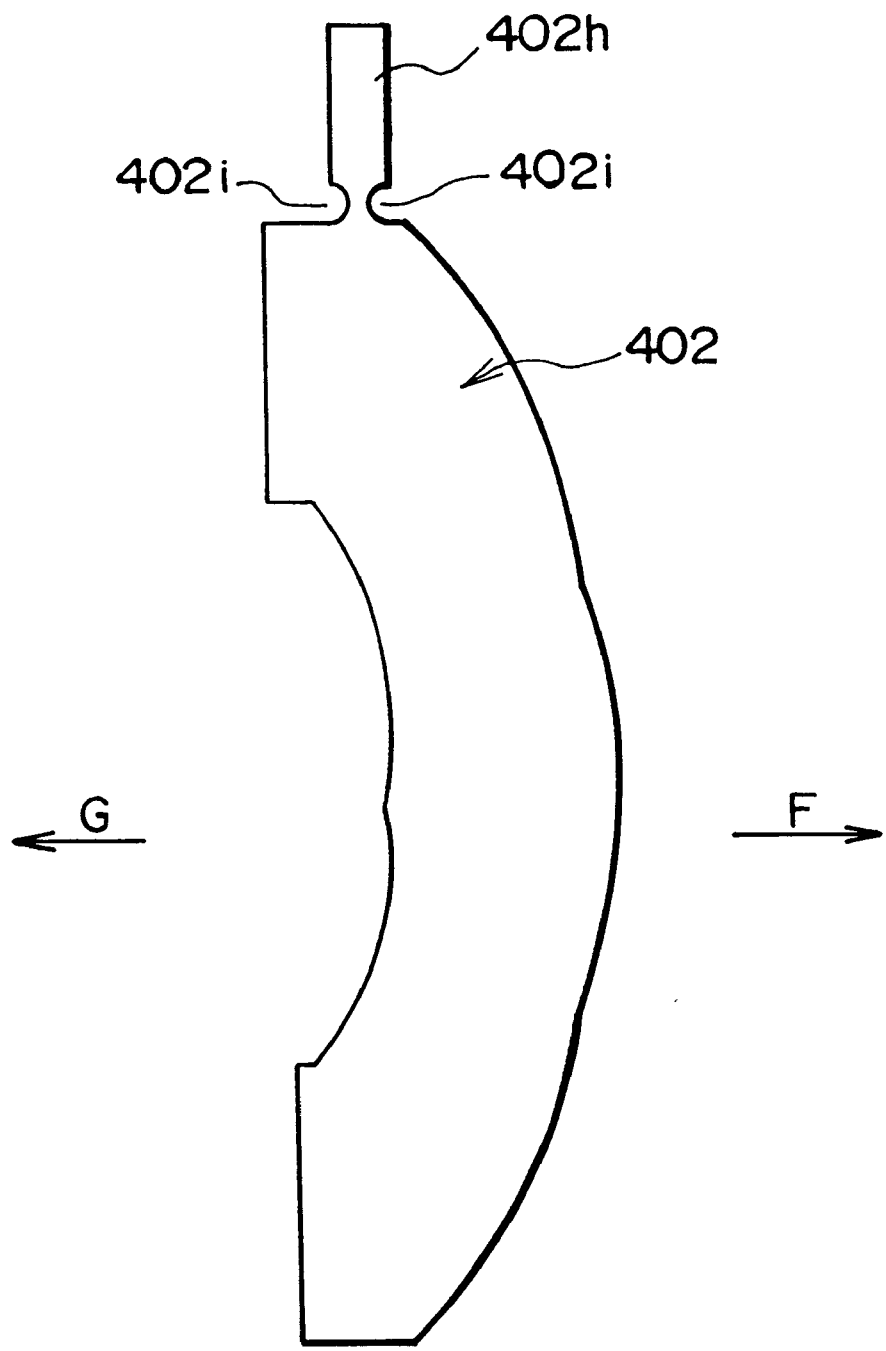
FIG. 25 is a view showing the shape of an optical element according to the ninth embodiment of the present invention.

As another attachment shape that does not adversely influence the portion requiring high optical performance, an example shown in FIG. 25 is also available. In FIG. 25, reference numeral 402 denotes a second optical element according to the ninth embodiment. Reference numeral 402h denotes an attachment portion formed on one end portion of the second optical element 402 like the attachment portion 302h. In this embodiment, however, groove portions 402i are formed as fastening stress relief portions in place of the slits 302i. Note that the shape shown in FIG. 25 allows mold release in the directions of arrows F and G. That is, the shape of this embodiment takes the mold structure into consideration. The first, second, and third optical elements 201, 202, and 203 also take the mold structure into consideration. In this embodiment, the attachment portion is formed by protruding one end portion of the optical element in its longitudinal direction. In order to prevent fastening stress from adversely influencing the optical performance, the attachment portion may protrude from a position separate from the refracting or reflecting surface of the optical element and perpendicular to these surfaces, more particularly, in a direction pointing out of or into the page, and may be attached to a fixing member, thus obtaining the same effect as in the above embodiments.

Referring back to FIG. 23, reference numeral 303 denotes a third optical element (corresponding to reference numeral 203 in FIG. 17), which is formed with an attachment portion 303h and slits 303i (not shown) as in the second optical element 302. The third optical element 303 is fixed to an upright portion 318f of a second movable base 318 by screws 351. Note that the attachment portions of the second and third optical elements 302 and 303 are formed on the side of a first guide rail 215 serving as a reference. This structure is used in consideration of expansion and shrinkage with temperature as in the seventh embodiment.

Furthermore, in this embodiment, the fixing position of the second optical element 302 to the first movable base 305 by the screws is nearly symmetrical to that of the third optical element 303 to the second movable base 318 by the screws to sandwich the first guide rail 215 therebetween in FIG. 23 (the distances from the guide rail 215 to these elements are also nearly equal to each other). When both the optical elements and movable bases consist of materials having nearly equal thermal expansion coefficients, e.g., when they consist of plastic materials, such layout can also prevent expansion/shrinkage due to changes in temperature from adversely influencing the optical performance. The advantage of such layout will be explained in detail below taking the second optical element 302 as an example.

For example, when the temperature rises, an attachment portion 305f of the first movable base 305 shifts in the direction of an arrow D due to expansion with reference to the first guide rail 215. However, the second optical element 302 shifts in the direction of an arrow C (opposite to the direction of the arrow D) by expansion with reference to its attachment portion 302h. That is, since these elements expand in directions to cancel each other, an optical axis of a surface 202f to a surface 203b (exit light from the second optical element 302, incident light to the third optical element 303) maintains a position roughly immediately above the first guide rail 215. Even when these elements shrink after the temperature drops, they shrink in directions to cancel each other, and the optical axis of the surface 202f→ the surface 203b can keep its position roughly immediately above the first guide rail 215. The same applies to the relationship between the third optical element 303 and the second movable base 318. With this arrangement, the exit optical axis from the second optical element 303 always guides an incident light beam onto a predetermined position of the third optical element 303, and the optical performance never deteriorates.

Projections (bulges pointing into the page in FIG. 23) 302g and 303g are formed on both the second and third optical elements 302 and 303 in FIG. 23.

These projections are formed for the following reason.

In the seventh embodiment, the optical element is fixed to the movable base by an adhesive. In the manufacture, it is assumed that the optical element is three-dimensionally positioned using a jig, and is fixed by an adhesive. In this embodiment, for example, as for the second optical element 302 (the same applies to the third optical element 303), the projections 302g are formed with high precision, and are used as a reference upon attachment. With this arrangement, after the optical element is placed on the movable base, it can be fixed to the movable base by only fastening the screws 350.

Note that a total of three projections must be formed at positions separated by largest possible distances in the longitudinal direction (the directions of the arrows C and D) and at a position separated by a largest possible distance in the widthwise direction (a direction perpendicular to the directions of the arrows C and D), so that the optical element can be stably placed on the first movable base 305. Also, butt surfaces may be formed on the first movable base 305 as needed with high precision to attain high-precision positioning.

If the optical element consists of glass, the second optical element 302, for example, may have no attachment portion 302h (the same shape as that of the second optical element 202 of the seventh embodiment), and at least one of the projections 302g may be fixed by an adhesive. In this case, since the positioning portion is fixed by an adhesive, the optical element can be positioned and fixed with high precision.

Reference numeral 306 denotes a first driving motor for moving the first movable base 305 along the first guide rail 215. The first driving motor 306 has a tongue-like cam portion 306c with an elongated hole portion 306a, which cam portion is coupled to a shaft portion 320 (see FIG. 24). Note that the elongated hole portion 306a engages with an engaging pin 305g formed on the first movable base 305. In FIG. 23, when the first driving motor 306 rotates from a chain line P to a chain line Q, the first movable base 305 and the second optical element 302 fixed thereto move in the direction of the arrow B. Note that FIG. 23 illustrates the positions of the cam portion 306c by two-dashed chain lines when the driving motor 306 has rotated a predetermined angle.

The second movable base 318 and the third optical element 303 fixed thereto move by a second driving motor 319 in the direction of the arrow B or in a direction opposite thereto. As in the first driving motor 306, the second driving motor 319 has a tongue-like cam portion 319c with an elongated hole portion 319a, which cam portion is coupled to a shaft portion (not shown), and the elongated hole portion 319a engages with an engaging pin 318g formed on the second movable base 318. With this structure, the second movable base 318 and the third optical element 303 can move in the direction of the arrow B or in a direction opposite thereto. Note that the positions of the cam portion 319c upon rotation of the second driving motor 319 by a predetermined angle are indicated by two-dashed chain lines.

The layout of the driving motors 306 and 319 in this embodiment will be described below.

In FIG. 23, the first driving motor 306 is arranged among the second and third optical elements 302 and 303, and a CCD 225, and the second driving motor 319 is arranged among the first, second, and third optical elements 301, 302, and 303. This layout is the same as that in the seventh embodiment to attain space savings and a size reduction of the device. However, in the seventh embodiment, the stepping motors 206 and 219 are merely arranged on dead spaces in the plan view (see FIG. 18). By contrast, in this embodiment, the driving motors 306 and 319 are arranged so that their motor shaft directions are perpendicular to the page of FIG. 23 (in the seventh embodiment, the shaft directions are parallel to the page). Furthermore, the moving mechanism adopts a cam mechanism. For this reason, as compared to the seventh embodiment, the driving motors 306 and 319 can shift in the direction of the arrow E in FIG. 24. As a result, the spaces where the stepping motors 206 and 219 in the seventh embodiment are arranged can be used as those for arranging a printed circuit board, and the like, and the space factor of the whole device can be improved, thus more contributing to a size reduction. In this embodiment, the cam mechanism is adopted. Alternatively, a gear train such as a spur gear, helical gear, and the like may be used to realize a low-profile structure, thus obtaining the same effect as in the above embodiment.

As described above, according to this embodiment, the same effect as in the seventh embodiment can be obtained.

Also, according to this embodiment, the same effect as in the seventh embodiment can be obtained, and since slits or grooves are formed on the projection of each optical element, the influence on the optical performance due to fixing stress can be further reduced.

Furthermore, according to this embodiment, a compact, low-profile image sensing device can be realized as in the seventh embodiment.

As described above, according to the present invention, deterioration of the optical performance of the optical element owing to the way of fixing the optical element can be prevented.

According to the present invention, in an optical device which comprises a zoom optical system having a plurality of optical elements in each of which a light beam is incident from one refracting surface, is reflected by a plurality of reflecting surfaces, and leaves the element from another refracting surface, and a driving means for driving the zoom optical system to attain zooming, deterioration of images caused by expansion/shrinkage of the optical elements due to changes in temperature, and changes in refracting power due to the expansion/shrinkage can be prevented.

Also, according to the present invention, a size reduction of an optical device that comprises a zoom optical system in which a light beam is incident from one refracting surface, is reflected by a plurality of reflecting surfaces, and leaves the element from another refracting surface, and a driving means for driving the zoom optical system to attain zooming can be attained.

Furthermore, according to the present invention, in an optical device which comprises a zoom optical system having a plurality of optical elements in each of which a light beam is incident from one refracting surface, is reflected by a plurality of reflecting surfaces, and leaves the element from another refracting surface, and a driving means for driving the zoom optical system to attain zooming, the zoom driving can be done with high precision.

As many apparently widely different embodiments of the present invention can be made without departing from the spirit and scope thereof, it is to be understood that the invention is not limited to the specific embodiments thereof except as defined in the appended claims.

What is claimed is:

1. An optical device comprising:

a first optical unit including a first optical element which has two refracting surfaces and a plurality of curved reflecting surfaces, wherein a light beam entered into the first optical element via one of the refracting surfaces of the first optical element is sequentially reflected by the plurality of curved reflecting surfaces and is output from the other refracting surface of the first optical element;

a second optical unit including a second optical element which has two refracting surfaces and a plurality of curved reflecting surfaces, wherein a light beam entered into the second optical element via one of the refracting surfaces of the second optical element is sequentially reflected by the plurality of curved reflecting surfaces and is output from the other refracting surface of the second optical element; and a guide member engaged with the first and second optical units, wherein the first and second optical units move along the guide member.

2. The device according to claim 1, further comprising a first actuator engaged with the first optical unit to move said first optical element along the guide member and a second actuator engaged with the second optical unit to move said second optical element along the guide member.

3. The device according to claim 2, wherein said first and second actuators move the first and second optical units by transmitting a rotational force to the first and second optical units; and a rotational axes of the first and second actuators are set to be parallel with the longitudinal axis of the guide member.

4. The device according to claim 1, further comprising a solid-state image sensor for receiving the light beam passing through the first and second optical units; an image sensing surface of the image sensor is set to be perpendicular to the longitudinal axis of the guide member.

5. An optical device comprising:

an optical unit including an optical element which has two refracting surfaces and a plurality of curved reflecting surfaces, wherein a light beam entered via one of the refracting surfaces into the optical element is sequentially reflected by the plurality of curved reflecting surfaces and is output from the other refracting;

a guide member engaged with the optical unit; and an actuator engaged with the optical unit to move the optical unit along the guide member by transmitting a rotational force to the optical unit, wherein a rotational axis of the actuator is set to be parallel with the longitudinal axis of the guide member.

6. An optical device comprising:

an optical unit including an optical element which has two refracting surfaces and a plurality of curved reflecting surfaces, wherein a light beam entered via one of the refracting surfaces into the optical element is sequentially reflected by the plurality of curved reflecting surfaces and is output from the other refracting surface;

a guide member engaged with the optical unit, wherein the optical unit moves along the guide member; and a solid-state image sensor for receiving the light beam passing through the optical unit, wherein an image sensing surface of the image sensor is set to be perpendicular to the longitudinal axis of the guide member.

* * * * *